United States Patent
Kawauchi et al.

(10) Patent No.: US 8,537,939 B2
(45) Date of Patent: Sep. 17, 2013

(54) RECEPTION APPARATUS, RECEPTION METHOD, RECEPTION PROGRAM, AND RECEPTION SYSTEM

(75) Inventors: Hidetoshi Kawauchi, Kanagawa (JP); Takashi Yokokawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 311 days.

(21) Appl. No.: 12/966,651

(22) Filed: Dec. 13, 2010

(65) Prior Publication Data

US 2011/0142098 A1    Jun. 16, 2011

(30) Foreign Application Priority Data

Dec. 15, 2009   (JP) .................................. 2009-283758

(51) Int. Cl.
*H04L 27/06* (2006.01)

(52) U.S. Cl.
USPC ............................. 375/343; 375/340; 375/260

(58) Field of Classification Search
USPC ........................ 375/259–260, 316, 340, 343
See application file for complete search history.

(56) References Cited

U.S. PATENT DOCUMENTS

| | | | | |
|---|---|---|---|---|
| 2004/0260985 | A1* | 12/2004 | Krieger | 714/707 |
| 2006/0098751 | A1* | 5/2006 | Zhang et al. | 375/260 |
| 2010/0215107 | A1* | 8/2010 | Yang | 375/260 |

FOREIGN PATENT DOCUMENTS

DE    10 2008 016 874 A1    4/2009

OTHER PUBLICATIONS

U.S. Appl. No. 13/236,005, filed Sep. 19, 2011, Kawauchi, et al.
Extended Search Report issued Feb. 8, 2012 in Europe Application No. 10194197.9.
"Digital Video Broadcasting (DVB); Implementation guidelines for a second generation digital terrestrial television broadcasting system (DVB-T2)" draft ETSI TR 102 831, V0.9.12 (Oct. 2009), Technical Report, 2009, 202 pages.

* cited by examiner

*Primary Examiner* — Emmanuel Bayard
(74) *Attorney, Agent, or Firm* — Oblon, Spivak, McClelland, Maier & Neustadt, L.L.P.

(57) ABSTRACT

Disclosed herein is a reception apparatus including: a spectrum inversion detection section configured to detect the occurrence or absence of spectrum inversion in a received signal complying with the Digital Video Broadcasting-Terrestrial 2 standard known as DVB-T2, using a P1 signal constituting the received signal; a spectrum inversion section configured to perform a spectrum inversion process on the received signal if the occurrence of the spectrum inversion is detected at least by the spectrum inversion detection section; and a demodulation section configured to demodulate the received signal having undergone the spectrum inversion process if the occurrence of the spectrum inversion is detected by the spectrum inversion detection section, the demodulation section further demodulating the received signal yet to undergo the spectrum inversion process if the absence of the spectrum inversion is detected by the spectrum inversion detection section.

18 Claims, 23 Drawing Sheets

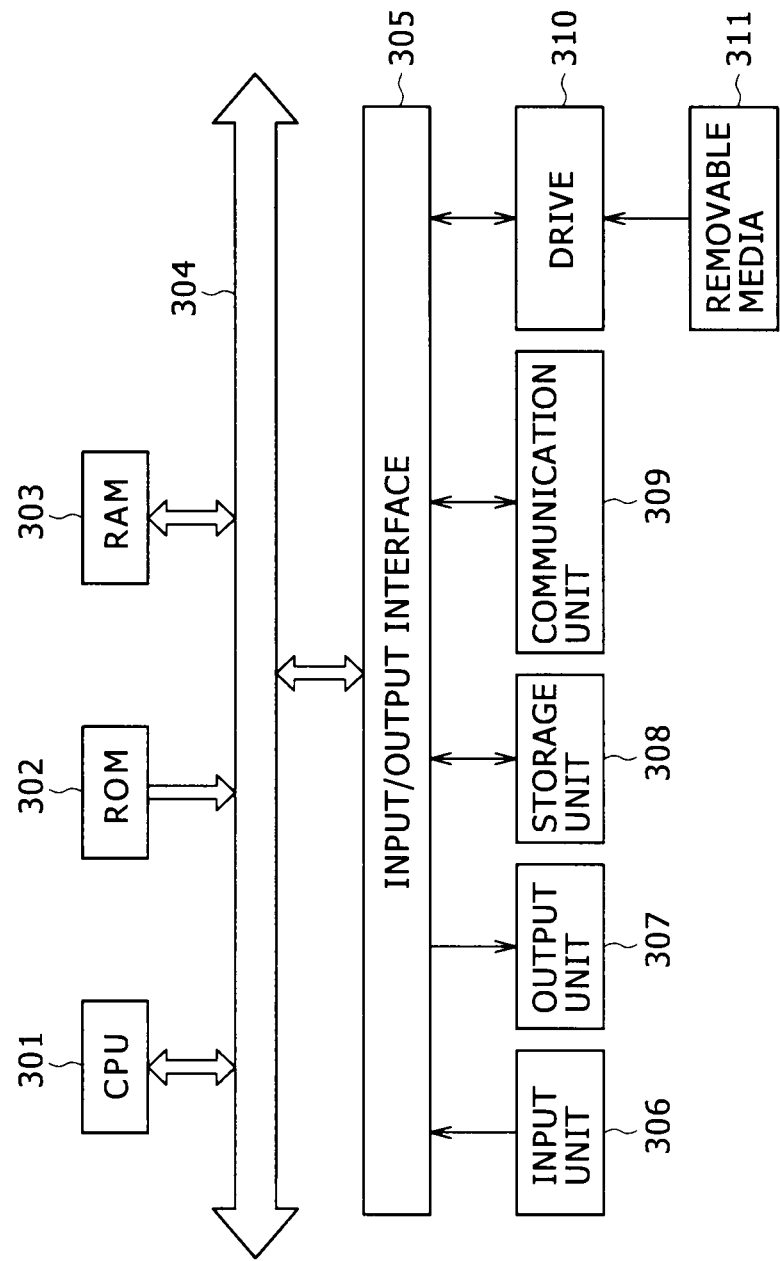

RECEPTION APPARATUS, RECEPTION METHOD, RECEPTION PROGRAM, AND RECEPTION SYSTEM

BACKGROUND OF THE INVENTION

1. Field of the Invention

The present invention relates to a reception apparatus, a reception method, a reception program, and a reception system. More particularly, the invention relates to a reception apparatus, a reception method, a reception program, and a reception system whereby signals received in compliance with the DVB-T2 (Digital Video Broadcasting-Terrestrial 2) standard can be demodulated correctly even if spectrum inversion occurs.

2. Description of the Related Art

The DVB-T2 standard is currently worked out as a representative standard for terrestrial digital broadcasting (see "Frame structure channel coding and modulation for a second-generation digital terrestrial television broadcasting system (DVB-T2)," a DVB website updated on Jun. 30, 2008; searched for on May 27, 2009 on the Internet at <URL=http://www.dvb.org/technology/dvbt2/a122.tm3980r5.DVB-T2.pdf>). Terrestrial digital broadcasts based on the DVB-T2 standard utilize the modulation method called OFDM (Orthogonal Frequency Division Multiplexing).

FIG. 1 is a schematic view showing a composition example of a digital signal in compliance with the DVB-T2 standard.

As shown in FIG. 1, the digital signal complying with the DVB-T2 standard (called the DVB-T2 signal hereunder) has two kinds of frames: frames based on the DVB-T2 standard (called the T2 frame each hereunder), and frames in compliance with some other standard than the DVB-T2 standard (called the FEF (future extension frame) part each hereunder), which is to be standardized in the future.

Each frame is headed by a P1 signal. The P1 signal indicates the FFT (Fast Fourier Transform) size of the frame in question, gives information indicating whether the communication method in use is MISO (Multiple Input Single Output) or SISO (Single Input Single Output), and provides information indicating whether the frame in question is an FEF part. If the frame turns out to be a T2 frame, it has its P1 signal followed by a P2 signal and a data signal.

SUMMARY OF THE INVENTION

Because the DVB-T2 signal is modulated by the OFDM method, the signal can develop spectrum inversion when the reception apparatus in use converts an RF signal into an IF signal. In such a case, the reception apparatus cannot demodulate the DVB-T2 signal correctly. When the P1 signal is not correctly demodulated, the reception apparatus cannot acquire information necessary for frame demodulation.

The present invention has been made in view of the above circumstances and provides a reception apparatus, a reception method, a reception program, and a reception system whereby the received signal in compliance with the DVB-T2 standard can be correctly demodulated even if spectrum inversion occurs.

In carrying out the present invention and according to one embodiment thereof, there is provided a reception apparatus including: spectrum inversion detection means for detecting the occurrence or absence of spectrum inversion in a received signal complying with the Digital Video Broadcasting-Terrestrial 2 standard known as DVB-T2, using a P1 signal constituting the received signal; spectrum inversion means for performing a spectrum inversion process on the received signal if the occurrence of the spectrum inversion is detected at least by the spectrum inversion detection means; and demodulation means for demodulating the received signal having undergone the spectrum inversion process if the occurrence of the spectrum inversion is detected by the spectrum inversion detection means, the demodulation means further demodulating the received signal yet to undergo the spectrum inversion process if the absence of the spectrum inversion is detected by the spectrum inversion detection means.

The reception apparatus embodying the present invention as outlined above corresponds to a reception method according to the invention and representing the functionality of the above-outlined reception apparatus, as well as to a program according to the invention and equivalent to the reception method.

Where the above-outlined reception apparatus embodying the present invention is in use, the occurrence or absence of spectrum inversion is detected from a received signal complying with the Digital Video Broadcasting-Terrestrial 2 standard known as DVB-T2, using a P1 signal constituting the received signal. A spectrum inversion process is performed on the received signal if the occurrence of the spectrum inversion is detected at least by the spectrum inversion detection means. The received signal having undergone the spectrum inversion process is demodulated if the occurrence of the spectrum inversion is detected; the received signal yet to undergo the spectrum inversion process is demodulated if the absence of the spectrum inversion is detected.

According to another embodiment of the present invention, there is provided a reception system including: acquisition means for acquiring over a transmission channel a signal complying with the Digital Video Broadcasting-Terrestrial 2 standard known as DVB-T2, as a received signal; and transmission channel decoding process means for performing a transmission channel decoding process on the received signal acquired by the acquisition means. The transmission channel decoding process means includes: spectrum inversion detection means for detecting the occurrence or absence of spectrum inversion in the received signal using a P1 signal constituting the received signal; spectrum inversion means for performing a spectrum inversion process on the received signal if the occurrence of the spectrum inversion is detected at least by the spectrum inversion detection means; and demodulation means for demodulating the received signal having undergone the spectrum inversion process if the occurrence of the spectrum inversion is detected by the spectrum inversion detection means, the demodulation means further demodulating the received signal yet to undergo the spectrum inversion process if the absence of the spectrum inversion is detected by the spectrum inversion detection means.

Where the above-outlined reception system embodying the present invention is in use, a signal complying with the Digital Video Broadcasting-Terrestrial 2 standard known as DVB-T2 is acquired as a received signal over a transmission channel; and a transmission channel decoding process is performed on the received signal thus acquired. During the transmission channel decoding process, the occurrence or absence of spectrum inversion is detected from the received signal using a P1 signal constituting the received signal. A spectrum inversion process is performed on the received signal if the occurrence of the spectrum inversion is detected at least by the spectrum inversion detection means. The received signal having undergone the spectrum inversion process is demodulated if the occurrence of the spectrum inversion is detected; the received signal yet to undergo the spectrum inversion process is demodulated if the absence of the spectrum inversion is detected.

According to a further embodiment of the present invention, there is provided a reception system including: transmission channel decoding process means for performing a transmission channel decoding process on a received signal which is acquired over a transmission channel and which complies with the Digital Video Broadcasting-Terrestrial 2 standard known as DVB-T2; and information source decoding process means for performing an information source decoding process on the received signal having undergone the transmission channel decoding process performed by the transmission channel decoding process means. The transmission channel decoding process means includes: spectrum inversion detection means for detecting the occurrence or absence of spectrum inversion in the received signal using a P1 signal constituting the received signal; spectrum inversion means for performing a spectrum inversion process on the received signal if the occurrence of the spectrum inversion is detected at least by the spectrum inversion detection means; and demodulation means for demodulating the received signal having undergone the spectrum inversion process if the occurrence of the spectrum inversion is detected by the spectrum inversion detection means, the demodulation means further demodulating the received signal yet to undergo the spectrum inversion process if the absence of the spectrum inversion is detected by the spectrum inversion detection means.

Where the above-outlined reception system embodying the present invention is in use, a transmission channel decoding process is performed on a received signal which is acquired over a transmission channel and which complies with the Digital Video Broadcasting-Terrestrial 2 standard known as DVB-T2; and an information source decoding process is performed on the received signal having undergone the transmission channel decoding process. During the transmission channel decoding process, the occurrence or absence of spectrum inversion is detected from the received signal using a P1 signal constituting the received signal. A spectrum inversion process is performed on the received signal if the occurrence of the spectrum inversion is detected at least by the spectrum inversion detection means. The received signal having undergone the spectrum inversion process is demodulated if the occurrence of the spectrum inversion is detected; the received signal yet to undergo the spectrum inversion process is demodulated if the absence of the spectrum inversion is detected.

According to an even further embodiment of the present invention, there is provided a reception system including: transmission channel decoding process means for performing a transmission channel decoding process on a received signal which is acquired over a transmission channel and which complies with the Digital Video Broadcasting-Terrestrial 2 standard known as DVB-T2; and output means for outputting an image or a sound based on the received signal having undergone the transmission channel decoding process performed by the transmission channel decoding process means. The transmission channel decoding process means includes: spectrum inversion detection means for detecting the occurrence or absence of spectrum inversion in the received signal using a P1 signal constituting the received signal; spectrum inversion means for performing a spectrum inversion process on the received signal if the occurrence of the spectrum inversion is detected at least by the spectrum inversion detection means; and demodulation means for demodulating the received signal having undergone the spectrum inversion process if the occurrence of the spectrum inversion is detected by the spectrum inversion detection means, the demodulation means further demodulating the received signal yet to undergo the spectrum inversion process if the absence of the spectrum inversion is detected by the spectrum inversion detection means.

Where the above-outlined reception system embodying the present invention is in use, a transmission channel decoding process is performed on a received signal which is acquired over a transmission channel and which complies with the Digital Video Broadcasting-Terrestrial 2 standard known as DVB-T2; and an image or a sound is output based on the received signal having undergone the transmission channel decoding process. During the transmission channel decoding process, the occurrence or absence of spectrum inversion is detected from the received signal using a P1 signal constituting the received signal. A spectrum inversion process is performed on the received signal if the occurrence of the spectrum inversion is detected at least by the spectrum inversion detection means. The received signal having undergone the spectrum inversion process is demodulated if the occurrence of the spectrum inversion is detected; the received signal yet to undergo the spectrum inversion process is demodulated if the absence of the spectrum inversion is detected.

According to a still further embodiment of the present invention, there is provided a reception system including: transmission channel decoding process means for performing a transmission channel decoding process on a received signal which is acquired over a transmission channel and which complies with the Digital Video Broadcasting-Terrestrial 2 standard known as DVB-T2; and recording control means for controlling the recording of the received signal having undergone the transmission channel decoding process performed by the transmission channel decoding process means. The transmission channel decoding process means includes: spectrum inversion detection means for detecting the occurrence or absence of spectrum inversion in the received signal using a P1 signal constituting the received signal; spectrum inversion means for performing a spectrum inversion process on the received signal if the occurrence of the spectrum inversion is detected at least by the spectrum inversion detection means; and demodulation means for demodulating the received signal having undergone the spectrum inversion process if the occurrence of the spectrum inversion is detected by the spectrum inversion detection means, the demodulation means further demodulating the received signal yet to undergo the spectrum inversion process if the absence of the spectrum inversion is detected by the spectrum inversion detection means.

Where the above-outlined reception system embodying the present invention is in use, a transmission channel decoding process is performed on a received signal which is acquired over a transmission channel and which complies with the Digital Video Broadcasting-Terrestrial 2 standard known as DVB-T2; and the recording is controlled of the received signal having undergone the transmission channel decoding process. During the transmission channel decoding process, the occurrence or absence of spectrum inversion is detected from the received signal using a P1 signal constituting the received signal. A spectrum inversion process is performed on the received signal if the occurrence of the spectrum inversion is detected at least by the spectrum inversion detection means. The received signal having undergone the spectrum inversion process is demodulated if the occurrence of the spectrum inversion is detected; the received signal yet to undergo the spectrum inversion process is demodulated if the absence of the spectrum inversion is detected.

According to the present invention embodied as outlined above, the received signal complying with the DVB-T2 standard can be demodulated correctly even if spectrum inversion occurs in the signal.

BRIEF DESCRIPTION OF THE DRAWINGS

Further features and advantages of the present invention will become apparent upon a reading of the following description and appended drawings in which:

FIG. 23 is a block diagram showing a composition example of a personal computer.

DETAILED DESCRIPTION OF THE PREFERRED EMBODIMENTS

<Premises of the Present Invention>
[Configuration Example of the Transmission System]

Figure 1:
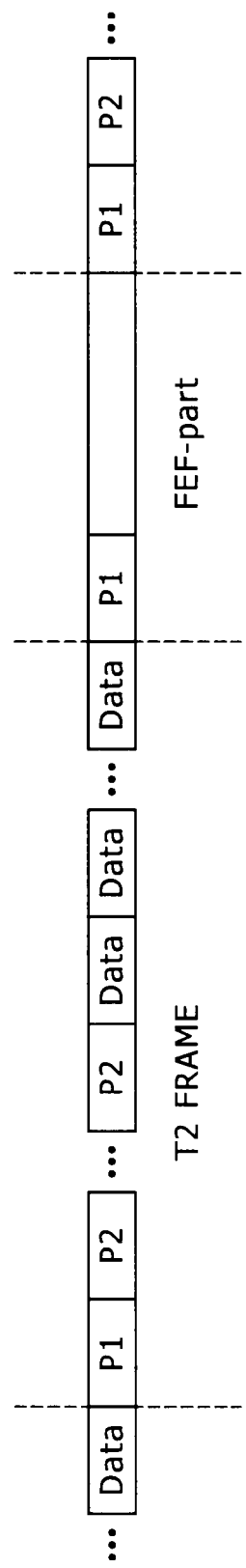
FIG. 1 is a schematic view showing a composition example of a digital signal in compliance with the DVB-T2 standard.
Figure 2:
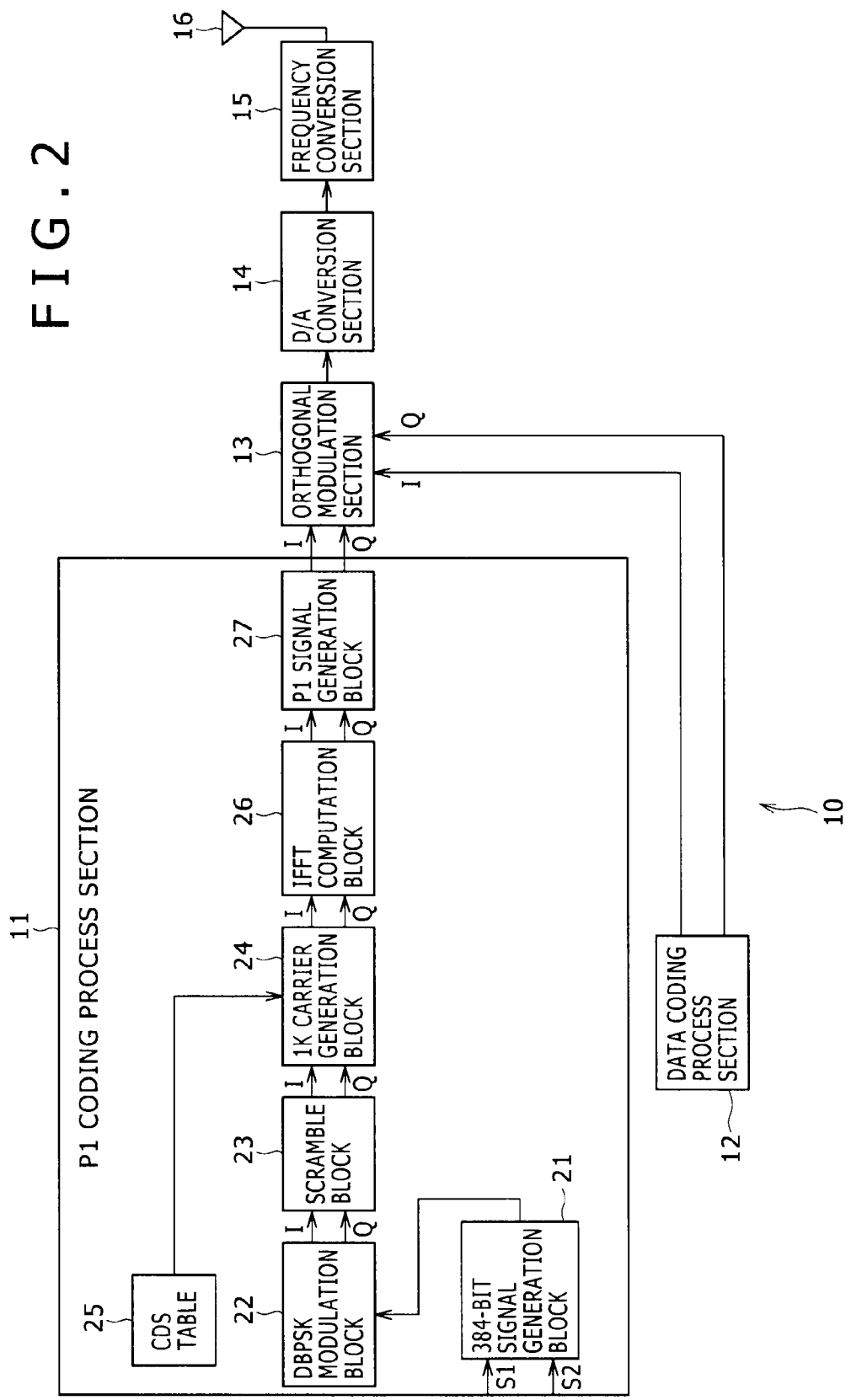
FIG. 2 is a block diagram showing a configuration example of a transmission system transmitting DVB-T2 signals.

FIG. 2 is a block diagram showing a configuration example of a transmission system 10 transmitting DVB-T2 signals.

The transmission system 10 in FIG. 2 is made up of a P1 coding process section 11, a data coding process section 12, an orthogonal modulation section 13, a D/A conversion section 14, a frequency conversion section 15, and an antenna 16. The transmission system 10 transmits DVB-T2 signals such as those of terrestrial digital broadcasts and satellite digital broadcasts.

The P1 coding process section 11 is composed of a 384-bit signal generation block 21, a DBPSK (Differential Binary Phase Shift Keying) modulation block 22, a scramble block 23, a 1K carrier generation block 24, a CDS table 25, an IFFT (Inverse Fast Fourier Transform) computation block 26, and a P1 signal generation block 27. Thus structured, the P1 coding process section 11 generates the P1 signal.

S1 and S2 signals representing the FFT size, communication method information, or type information about the frame in question are input to the 384-bit signal generation block 21. The 384-bit signal generation block 21 maps the S1 and S2 signals into a predetermined 0-1 sequence to generate a 384-bit signal.

Given the 384-bit signal generated by the 384-bit signal generation block 21, the DBPSK modulation block 22 performs DBPSK modulation of the received signal. The DBPSK modulation block 22 then supplies the scramble block 23 with the resulting DBPSK-modulated signal composed of I and Q components.

The scramble block 23 scrambles into an M-sequence the DBPSK-modulated signal fed from the DBPSK modulation block 22.

The 1K carrier generation block 24 reads effective carrier numbers from the CDS table 25 and, by reference to the retrieved effective carrier numbers, maps into 1K carriers the DBPSK-modulated signal scrambled by the scramble block 23 and composed of the I and Q components. The CDS table 25 stores the numbers of the effective carriers from among the 1K carriers.

The IFFT computation block 26 performs IFFT computation of a 1K signal composed of the I and Q components mapped by the 1K carrier generation block 24 into the 1K carriers. An IFFT signal resulting from the IFFT computation and composed of the I and Q components is sent from the IFFT computation block 26 to the P1 signal generation block 27.

The P1 signal generation block 27 generates a P1 signal composed of the I and Q components using the IFFT signal fed from the IFFT computation block 26. The P1 signal thus generated is supplied to the orthogonal modulation section 13.

The data coding process section 12 performs coding processes such as encryption, mapping, and IFFT computation of a signal that is input from the outside as representative of a frame size and other information, as well as a broadcast signal, thereby generating a P2 signal composed of the I and Q components along with a data signal. The data coding process section 12 then supplies the orthogonal modulation section 13 with the P2 signal composed of the I and Q components and the data signal.

The orthogonal modulation section 13 performs orthogonal modulation of both the P1 signal fed from the P1 signal generation block 27 and the DVB-T2 signal composed of the P2 and data signals coming from the data coding process section 12.

The D/A conversion section 14 performs D/A conversion of the DVB-T2 signal acquired through the orthogonal modulation by the orthogonal modulation section 13. The resulting analog signal is sent to the frequency conversion section 15.

The frequency conversion section 15 performs frequency conversion of the analog signal coming from the D/A conversion section 14, thereby generating an RF (radio frequency) signal. The RF signal is transmitted from the antenna 16 over transmission channels such as terrestrial or satellite waves.

[Explanation of Effective Carriers]

Figure 3:
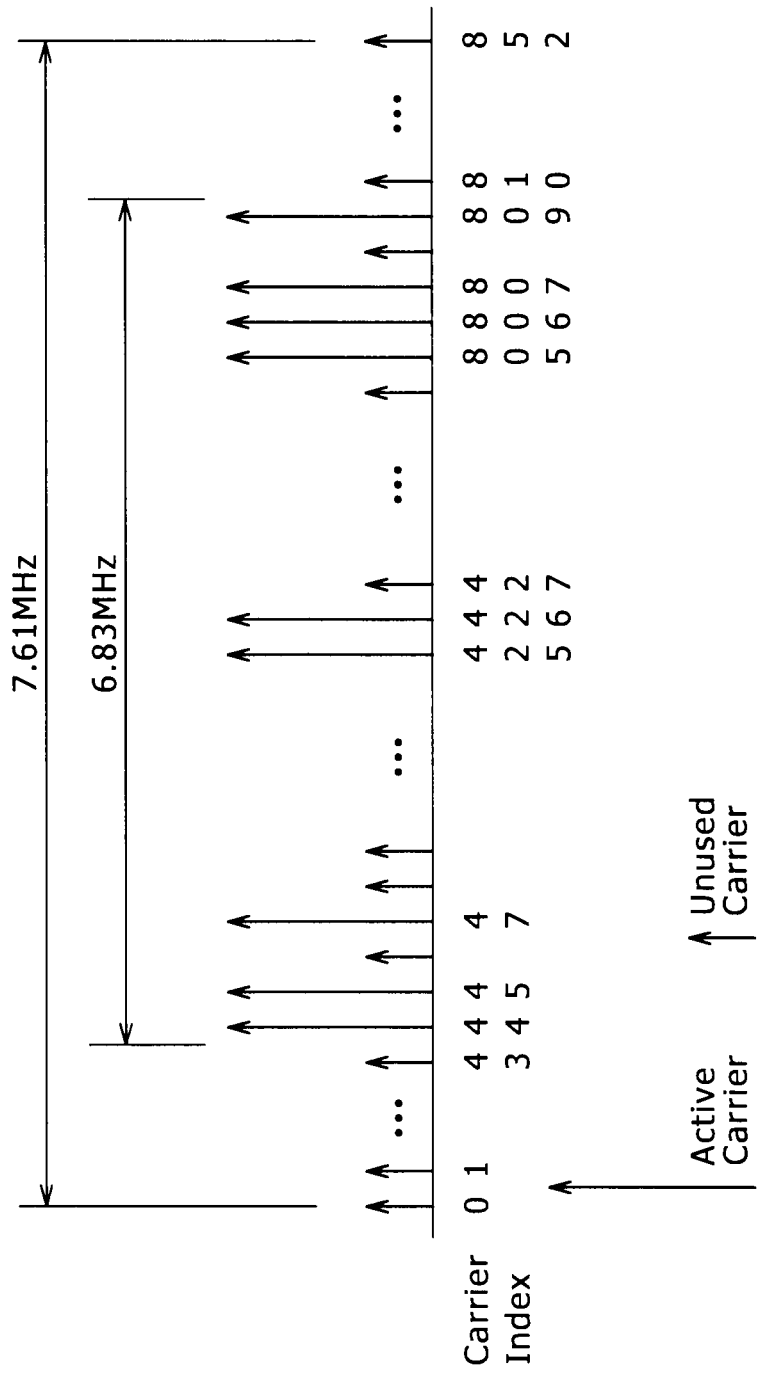
FIG. 3 is a schematic view explanatory of information carriers.

FIG. 3 is a schematic view explanatory of information carriers as part of a 1K-carrier signal generated by the 1K carrier generation block 24.

As shown in FIG. 3, of the 1,024 carriers making up the 1K-carrier signal, 853 carriers are allotted as information carriers. Of these information carriers, 384 carriers are allotted as effective carriers that are used to transmit substantive information.

[Explanation of the P1 Signal]

Figure 4:
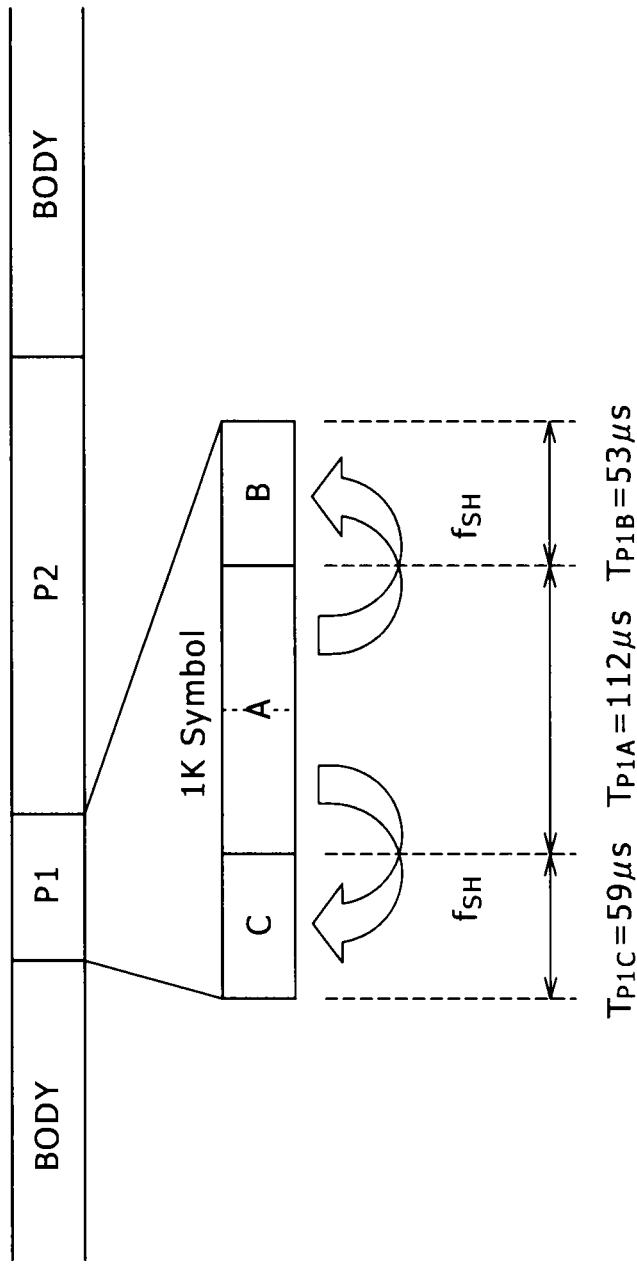
FIG. 4 is a schematic view showing a composition example of a P1 signal.

FIG. 4 is a schematic view showing a composition example of the P1 signal.

As shown in FIG. 4, the P1 signal has a C-A-B structure. That is, a real information part A of the P1 signal is preceded by and partially overlaid with an overlay part C, the rest of the real information part A being further followed by and overlaid with an overlay part B. The overlay parts C and B are each made higher by $f_{sH}$ in frequency than the real information part A when inserted.

<First Embodiment>

[Configuration Example of the Reception System as the First Embodiment]

Figure 5:
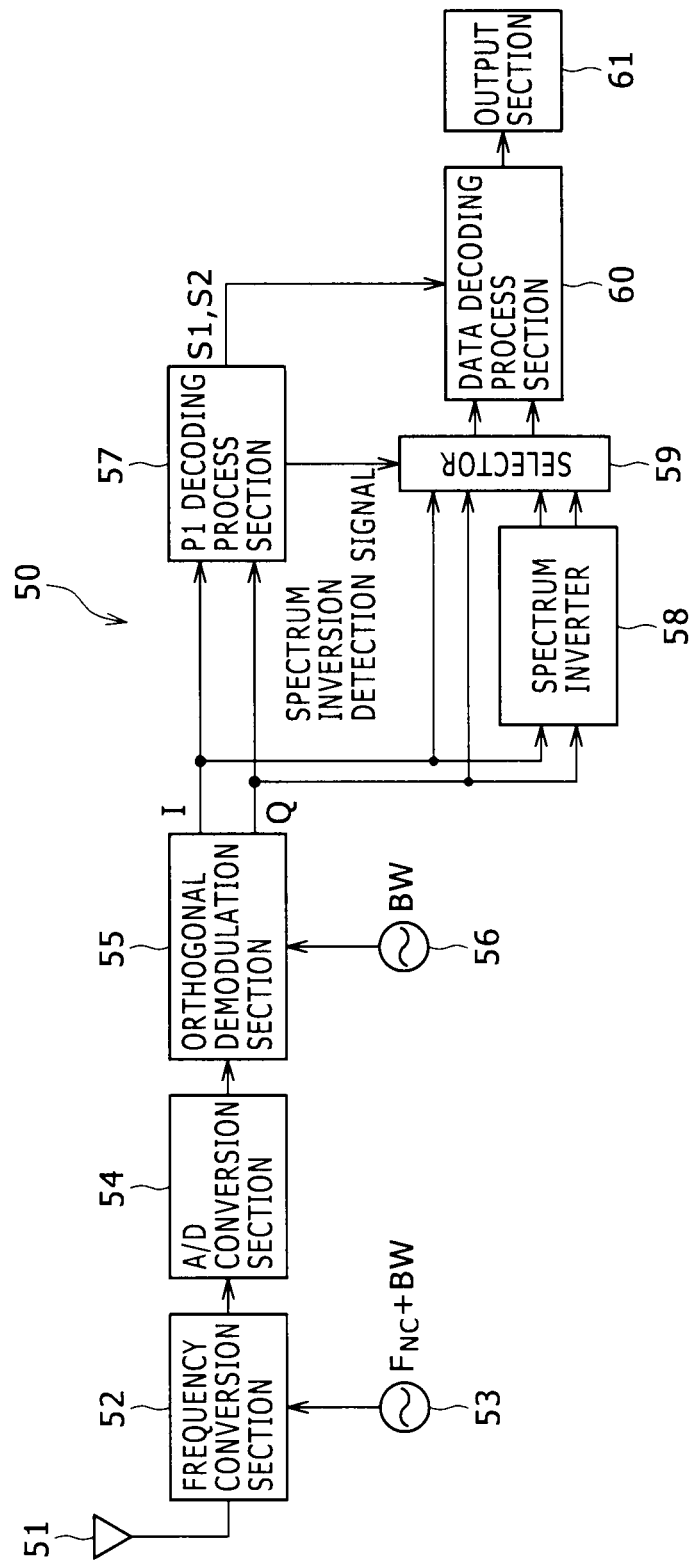
FIG. 5 is a block diagram showing a configuration example of a reception system as a first embodiment of the present invention.

FIG. 5 is a block diagram showing a configuration example of a reception system as the first embodiment of the present invention.

The reception system 50 in FIG. 5 is made up of an antenna 51, a frequency conversion section 52, a local oscillator 53, an A/D conversion section 54, an orthogonal demodulation section 55, a local oscillator 56, a P1 decoding process section 57, a spectrum inverter 58, a selector 59, a data decoding process section 60, and an output section 61.

The antenna 51 acquires the RF signal out of the DVB-T2 signal sent from the transmission system 10 in FIG. 2. The RF signal thus acquired is fed to the frequency conversion section 52.

The frequency conversion section 52 multiplies the RF signal coming from the antenna 51 by a carrier having an oscillation frequency of ($F_{NC}$+BW) supplied by the local oscillator 53, thereby converting the RF signal into an IF signal having the center frequency $F_{NC}$. At this point, spectrum inversion may take place. The frequency conversion section 52 sends the IF signal to the A/D conversion section 54.

The local oscillator 53 generates the carrier with the oscillation frequency ($F_{NC}$+BW). The carrier thus generated is supplied to the frequency conversion section 52.

The A/D conversion section 54 performs A/D conversion of the IF signal coming from the frequency conversion section 52. The resulting IF signal in digital form is sent to the orthogonal demodulation section 55.

The orthogonal demodulation section 55 orthogonally demodulates the IF signal coming from the A/D conversion section 54 using the carrier with the oscillation frequency BW fed from the local oscillator 56. The orthogonal demodulation section 55 supplies the signal composed of the I and Q components and acquired through orthogonal demodulation to the P1 decoding process section 57, spectrum inverter 58, and selector 59. The local oscillator 56 generates the carrier with the oscillation frequency BW and sends the generated carrier to the orthogonal demodulation section 55.

The P1 decoding process section 57 detects and decodes the P1 signal out of the signal coming from the orthogonal demodulation section 55. At the same time, the P1 decoding process section 57 detects whether or not spectrum inversion has occurred in the received DVB-T2 signal. The P1 decoding process section 57 supplies the selector 59 with a spectrum inversion detection signal indicating the result of the detection. The P1 decoding process section 57 will be explained later in more detail by reference to FIG. 6.

The spectrum inverter 58 performs a spectrum inversion process on the signal composed of the I and Q components and fed from the orthogonal demodulation section 55. The spectrum inverter 58 then supplies the selector 59 with the resulting signal composed of the I and Q components.

In keeping with the spectrum inversion detection signal from the P1 decoding process section 57, the selector 59 selects one of two signals: the signal yet to undergo the spectrum inversion process and coming from the orthogonal demodulation section 55, or the signal having undergone the spectrum inversion process and fed from the spectrum inverter 58. The selector 59 feeds the selected signal to the data decoding process section 60.

The data decoding process section 60 performs transmission channel decoding (e.g., demodulation) and information source decoding of the P2 signal and data signal out of the signal supplied from the selector 59, using the S1 and S2 signals obtained through the decoding by the P1 decoding process section 57. A broadcast signal thus acquired is sent from the data decoding process section 60 to the output section 61.

The output section 61 is typically constituted by a display and speakers. The output section 61 outputs an image and/or a sound based on the broadcast signal supplied from the data decoding process section 60.

[Detailed Composition Example of the P1 Decoding Process Section]

Figure 6:
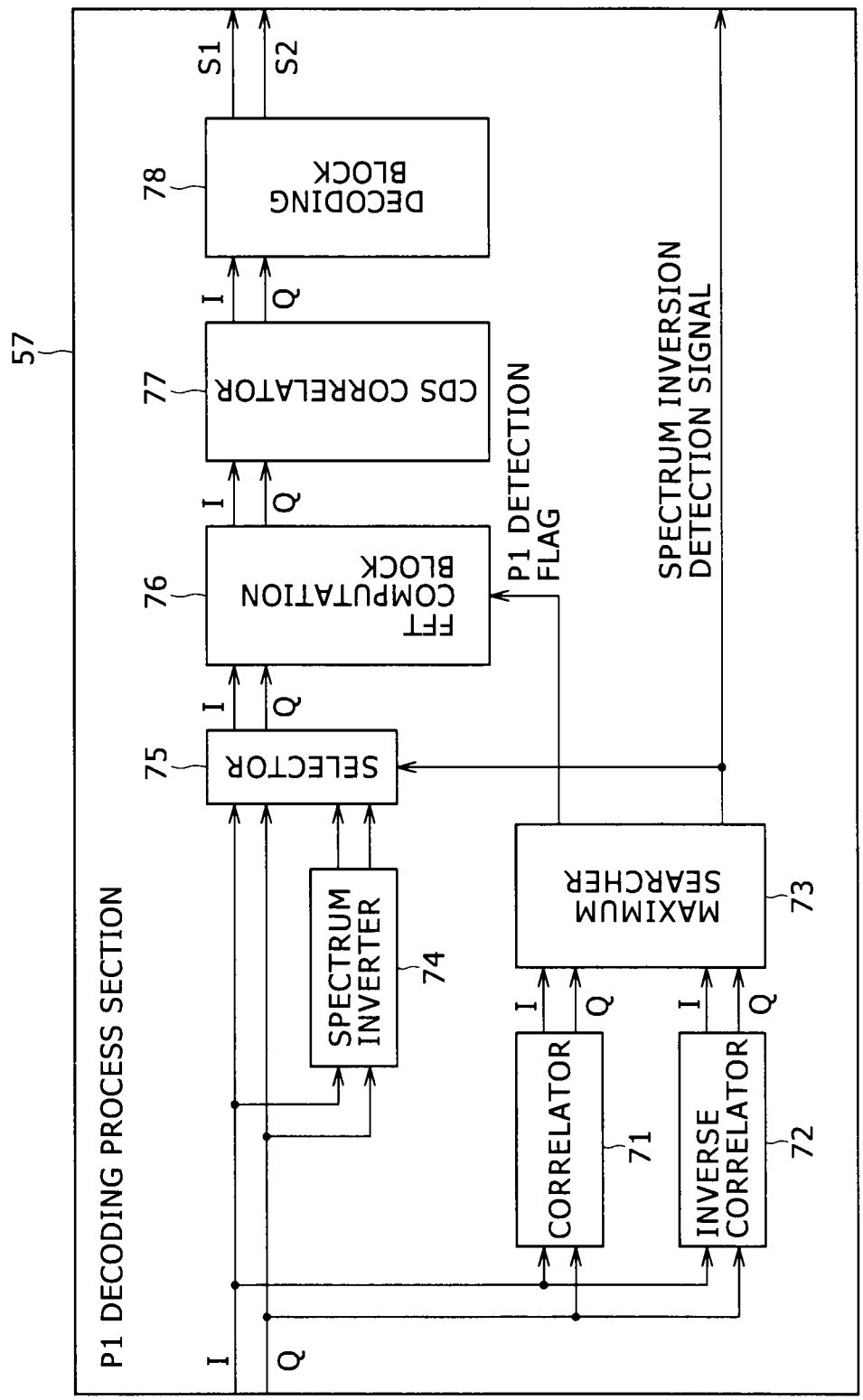
FIG. 6 is a block diagram showing a detailed composition example of a P1 decoding process section.

FIG. 6 is a block diagram showing a detailed composition example of the P1 decoding process section 57 in FIG. 5.

As shown in FIG. 6, the P1 decoding process section 57 is made up of a correlator 71, an inverse correlator 72, a maximum searcher 73, a spectrum inverter 74, a selector 75, an FFT computation block 76, a CDS correlator 77, and a decoding block 78.

The correlator 71 obtains a correlation value of the signal composed of the I and Q components and supplied from the orthogonal demodulation section 55 in FIG. 5, on the assumption that spectrum inversion has not occurred. The correlation value thus acquired is fed to the maximum searcher 73. The correlator 71 will be explained later in more detail by reference to FIG. 7.

The inverse correlator 72 obtains a correlation value of the signal composed of the I and Q components and fed from the orthogonal demodulation section 55 on the assumption that spectrum inversion has occurred. The correlation value thus acquired is sent to the maximum searcher 73. The correlator 72 will be explained later in more detail by reference to FIGS. 10 and 11.

The maximum searcher 73 performs a P1 signal detection process and a spectrum inversion detection process using the correlation values each composed of the I and Q components and supplied from the correlator 71 and inverse correlator 72. The maximum searcher 73 proceeds to send a P1 detection flag indicating the result of the P1 signal detection process to the FFT computation block 76 and a spectrum inversion detection signal representing the result of the spectrum inversion detection process to the selector 75 as well as to the selector 59 in FIG. 5. The maximum searcher 73 will be explained later in more detail by reference to FIG. 12 and other drawings.

The spectrum inverter 74 performs a spectrum inversion process on the signal composed of the I and Q components and supplied from the orthogonal demodulation section 55. A signal resulting from the spectrum inversion process and composed of the I and Q components is sent from the spectrum inverter 74 to the selector 75.

In accordance with the spectrum inversion detection signal from the maximum searcher 73, the selector 75 selects one of two signals: the signal yet to undergo the spectrum inversion process and coming from the orthogonal demodulation section 55, or the signal having undergone the spectrum inversion process and supplied from the spectrum inverter 74. The selector 75 feeds the selected signal to the FFT computation block 76.

Based on the P1 detection flag from the maximum searcher 73, the FFT computation block 76 performs FFT computation of the signal which comes from the selector 75, which contains 1,024 data items and which is composed of the I and Q components. The FFT computation block 76 then supplies the CDS correlator 77 with the 1,024 data signals resulting from the FFT computation and composed of the I and Q components. Furthermore, the FFT computation block 76 supplies the CDS correlator 77 with a symbol start signal.

The CDS correlator 77 extracts 384 data signals of effective carriers from the 1,024 data signals fed from the FFT computation block 76 and composed of the I and Q components, in response to the symbol start signal from the FFT computation block 76 and by reference to the effective carrier numbers stored in a memory, not shown. The signals thus extracted are sent from the CDS correlator 77 to the decoding block 78.

The CDS correlator 77 also obtains a correlation value of the 1,024 data signals fed from the FFT computation block 76 and composed of the I and Q components. The CDS correlator 77 then acquires a carrier-by-carrier offset amount $F_{offset}$ (called the maximum unit offset amount hereunder) based on the correlation value thus obtained. The maximum unit offset amount $F_{offset}$ is sent to the local oscillator 53 (FIG. 5). This causes the center frequency $F_{NC}$ of the carrier generated by the local oscillator 53 to be changed to $F_{NC}+F_{offset}$. As a result, the carrier-by-carrier frequency error of the DVB-T2 signal is corrected.

In the manner described above, the correlator 71, inverse correlator 72, maximum searcher 73, spectrum inverter 74, selector 75, FFT computation block 76, and CDS correlator 77 perform the transmission channel decoding process that is a decoding process executed on the transmission channel.

The decoding block 78 performs decoding and DBPSK demodulation of the 384 data signals fed from the CDS correlator 77 and composed of the I and Q components, and also extracts the S1 and S2 signals from the received signals. It should be noted that the decoding done by the decoding block 78 corresponds to the scrambling by the scramble block 23 in FIG. 2; the DBPSK demodulation corresponds to the DBPSK modulation carried out by the DBPSK modulation block 22 in FIG. 2; and the extraction of the S1 and S2 signals corresponds to the mapping performed by the 384-bit signal generation block 21 in FIG. 2.

The decoding block 78 outputs the extracted S1 and S2 signals. Also, the decoding block 78 outputs an enable flag to registers 163 and 173 (in FIG. 12, to be discussed later) of the maximum searcher 73 so that the reset of the registers 163 and 173 will be enabled.

In the manner described above, the decoding block 78 performs the information source decoding process that is the decoding process with regard to the information represented by the P1 signal.

[Explanation of the Correlator]

Figure 7:
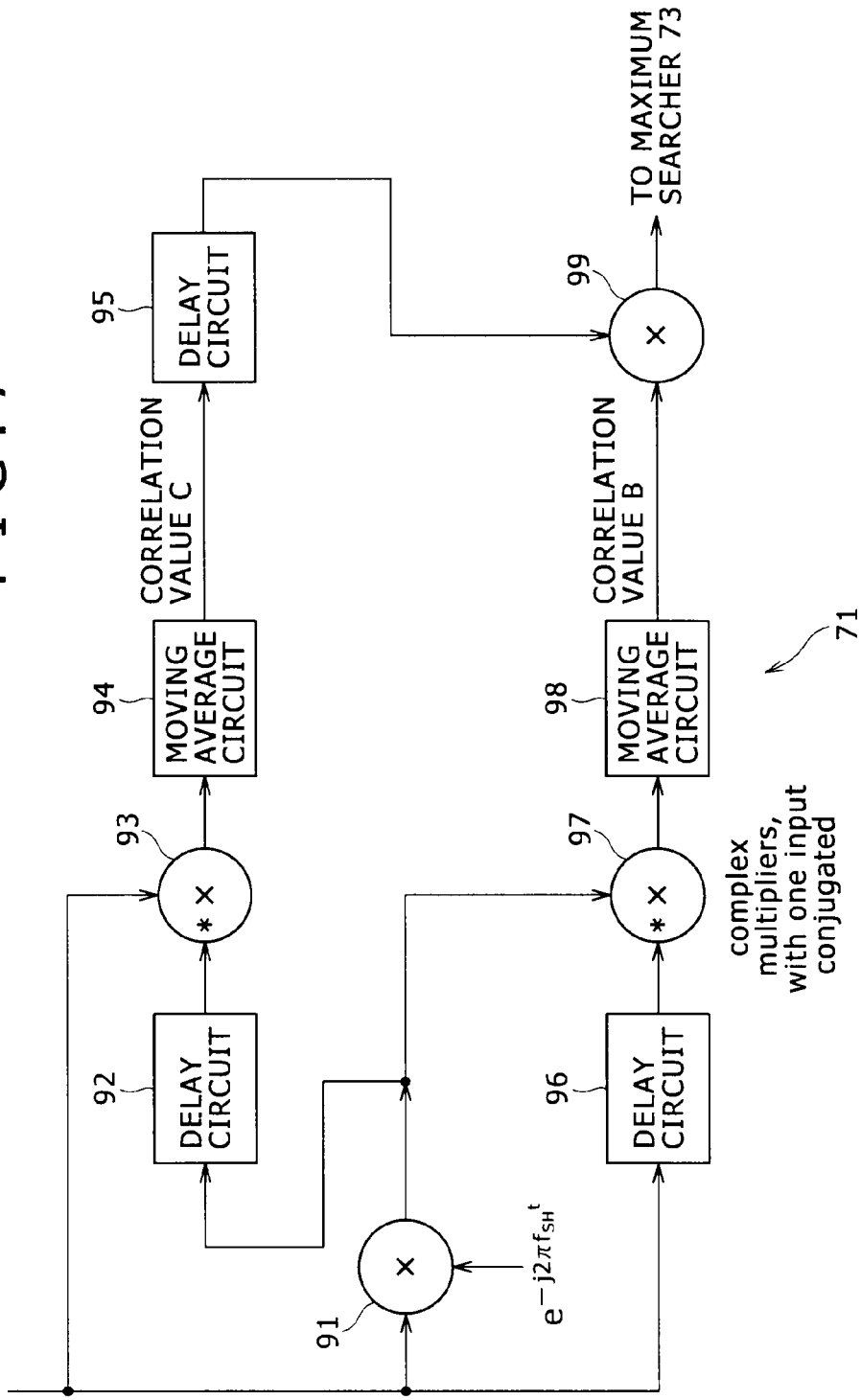
FIG. 7 is a block diagram showing a detailed composition example of a correlator.

FIG. 7 is a block diagram showing a detailed composition example of the correlator 71 in FIG. 6.

In FIG. 7, the correlator 71 is made up of a frequency shifter 91, a delay circuit 92, a multiplier 93, a moving average circuit 94, a delay circuit 95, a delay circuit 96, a multiplier 97, a moving average circuit 98, and a multiplier 99.

The frequency shifter 91 multiplies the signal fed from the orthogonal demodulation section 55 in FIG. 5 and composed of the I and Q components by $e^{-j2\pi f_{SH}t}$, thereby lowering the frequency of the signal by a frequency of $f_{SH}$. With this multiplication carried out, if the signal coming from the orthogonal demodulation section 55 is a P1 signal with no spectrum inversion occurring therein, then the frequency of the overlay parts C and B in the P1 signal becomes the same as the original frequency of the real information part A in that P1 signal. The frequency shifter 91 supplies a signal having its frequency lowered by the frequency $f_{SH}$ to the delay circuit 92 and multiplier 97.

Given the signal from the frequency shifter 91, the delay circuit 92 delays the received signal by Tc representing the length of the overlay part C of the P1 signal. The signal thus delayed is sent to the multiplier 93.

The multiplier 93 receives two signals: the signal resulting from the orthogonal demodulation performed by the orthogonal demodulation section 55, and the signal delayed by the delay circuit 92. The multiplier 93 multiplies the input signals, and feeds the result of the multiplication to the moving average circuit 94.

The moving average circuit 94 obtains a moving average of the multiplication result supplied from the multiplier 93. The resulting moving average is sent as a correlation value C to the delay circuit 95.

The delay circuit 95 delays the correlation value C from the moving average circuit 94 in such a manner that the correlation value C will be input to the multiplier 99 at the same time as a correlation value B coming from the moving average circuit 98. The delay circuit 95 feeds the delayed correlation value C to the multiplier 99.

The delay circuit 96 delays the signal from the orthogonal demodulation section 55 by Tb representing the length of the overlay part B in the P1 signal. The signal thus delayed is sent to the multiplier 97.

The multiplier 97 multiplies the signal from the frequency shifter 91 by the signal from the delay circuit 96. The result of the multiplication is forwarded to the moving average circuit 98.

The moving average circuit 98 obtains a moving average of the multiplication result fed from the multiplier 97. The resulting moving average is supplied as a correlation value B to the multiplier 99.

The multiplier 99 multiplies the correlation value C from the delay circuit 95 by the correlation value B from the moving average circuit 98. The result of the multiplication is sent as a correlation value to the maximum searcher 73 (FIG. 6).

Figure 8:
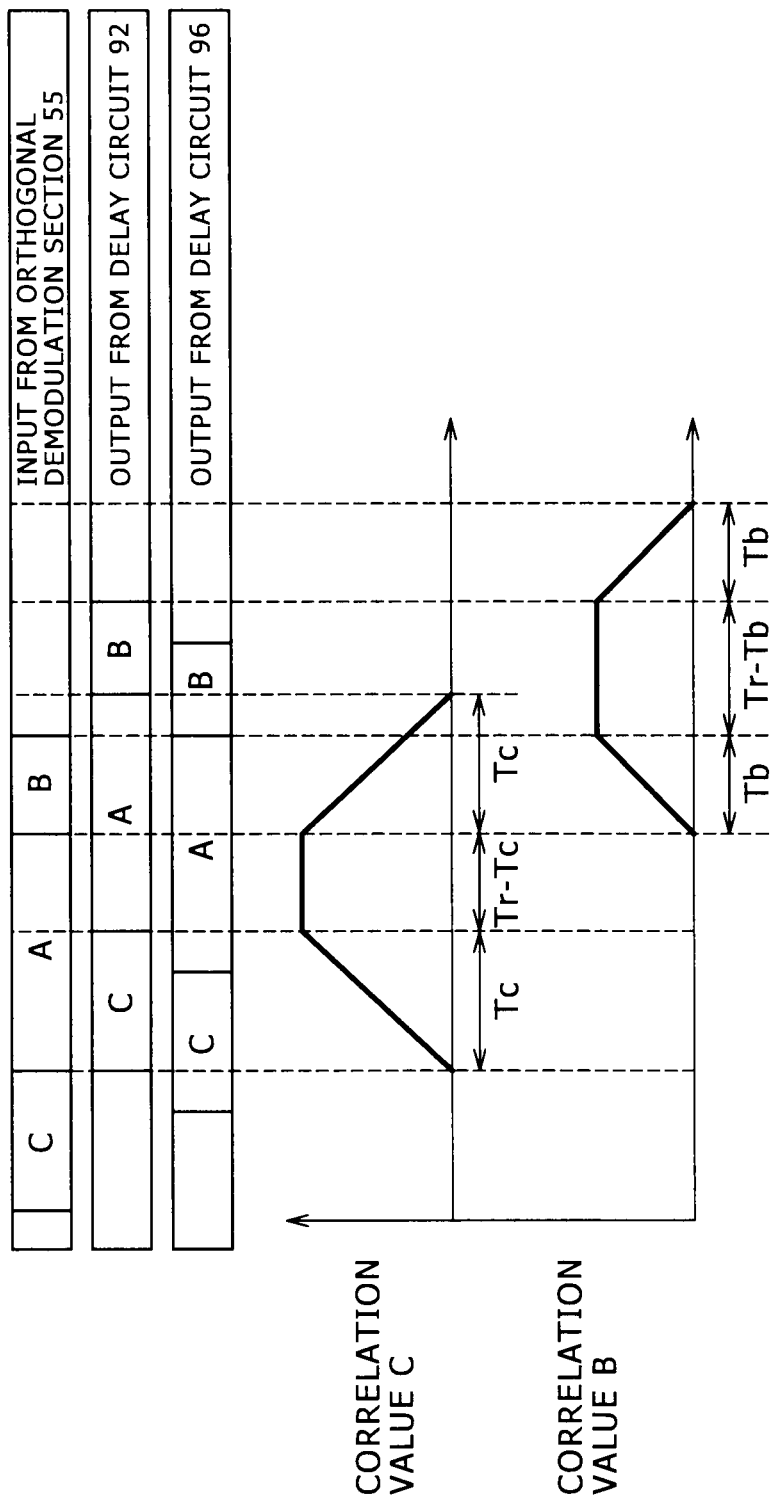
FIG. 8 is a schematic view explanatory of correlation values B and C before delay.
Figure 9:
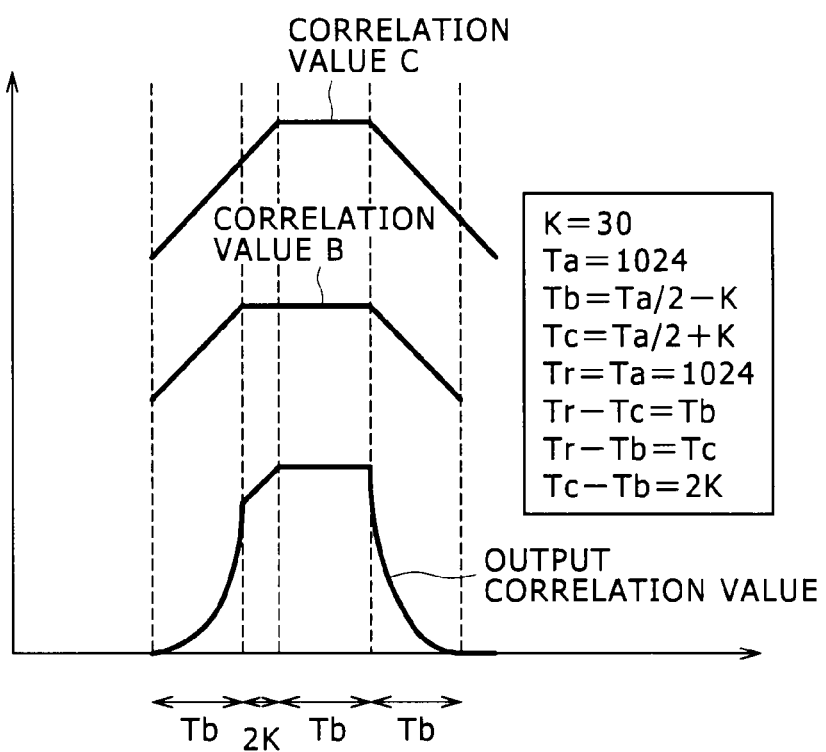
FIG. 9 is a schematic view showing correlation values B and C after delay along with an output correlation value.

FIG. 8 is a schematic view explanatory of the correlation values B and C before delay where the signal input from the orthogonal demodulation section 55 is a P1 signal with no spectrum inversion occurring therein. FIG. 9 is a schematic view showing the correlation values B and C after delay along with an output correlation value where the case of FIG. 8 applies.

As shown in FIG. 8, if the signal input from the orthogonal demodulation section 55 is a P1 signal with no spectrum inversion occurring therein, then the P1 signal output from the delay circuit 92 is started at a starting time of the real information part A in the P1 signal input from the orthogonal demodulation section 55. The frequency of the overlay parts C and B in the P1 signal output from the delay circuit 92 becomes the same as the frequency of the real information part A in the P1 signal input from the orthogonal demodulation section 55.

Also, the P1 signal output from the delay circuit 96 has the start position of its overlay part B coinciding with the end position of the overlay part B in the P1 signal input from the orthogonal demodulation section 55. The frequency of the real information part A in the P1 signal output from the delay circuit 96 becomes the same as the frequency of the overlay parts C and B in the P1 signal output from the frequency shifter 91.

As described above, the correlation value C increases at a predetermined gradient over the length Tc from the start position of the real information part A in the P1 signal input from the orthogonal demodulation section 55, as shown in FIG. 8. The correlation value C then becomes constant over a length of Tr−Tc. Thereafter, the correlation value C decreases at a predetermined gradient over the length Tc. The length Tr represents the length of the real information part A.

Also as shown in FIG. 8, the correlation value B increases at a predetermined gradient over a length Tb from the start position of the overlay part B in the P1 signal input from the orthogonal demodulation section 55. The correlation value B then becomes constant over a length Tr−Tb. Thereafter, the correlation value B decreases at a predetermined gradient over the length Tb.

When the correlation value C above is delayed by the delay circuit 95, the timing for the correlation value C to start increasing coincides with the same timing of the correlation value B as shown in FIG. 9. Thus the correlation value output from the correlator 71 starts increasing over the length Tb, and increases at a predetermined gradient over 2K (=Tc−Tb) as shown in FIG. 9. The correlation value from the correlator 71 then becomes constant over the length Tb, before decreasing over the length Tb.

By contrast, where the P1 signal input from the orthogonal demodulation section 55 is a P1 signal with spectrum inversion occurring therein, even if the frequency shifter 91 lowers the frequency of the P1 signal by the frequency $f_{SH}$, the frequency of the overlay parts C and B in the P1 signal still does not become the same as the original frequency of the real information part A in that P1 signal. As a result, the correlation value output from the correlator 71 becomes smaller than the value in effect in the setup of FIG. 9.

[Detailed Composition Example of the Inverse Correlator]

Figure 10:
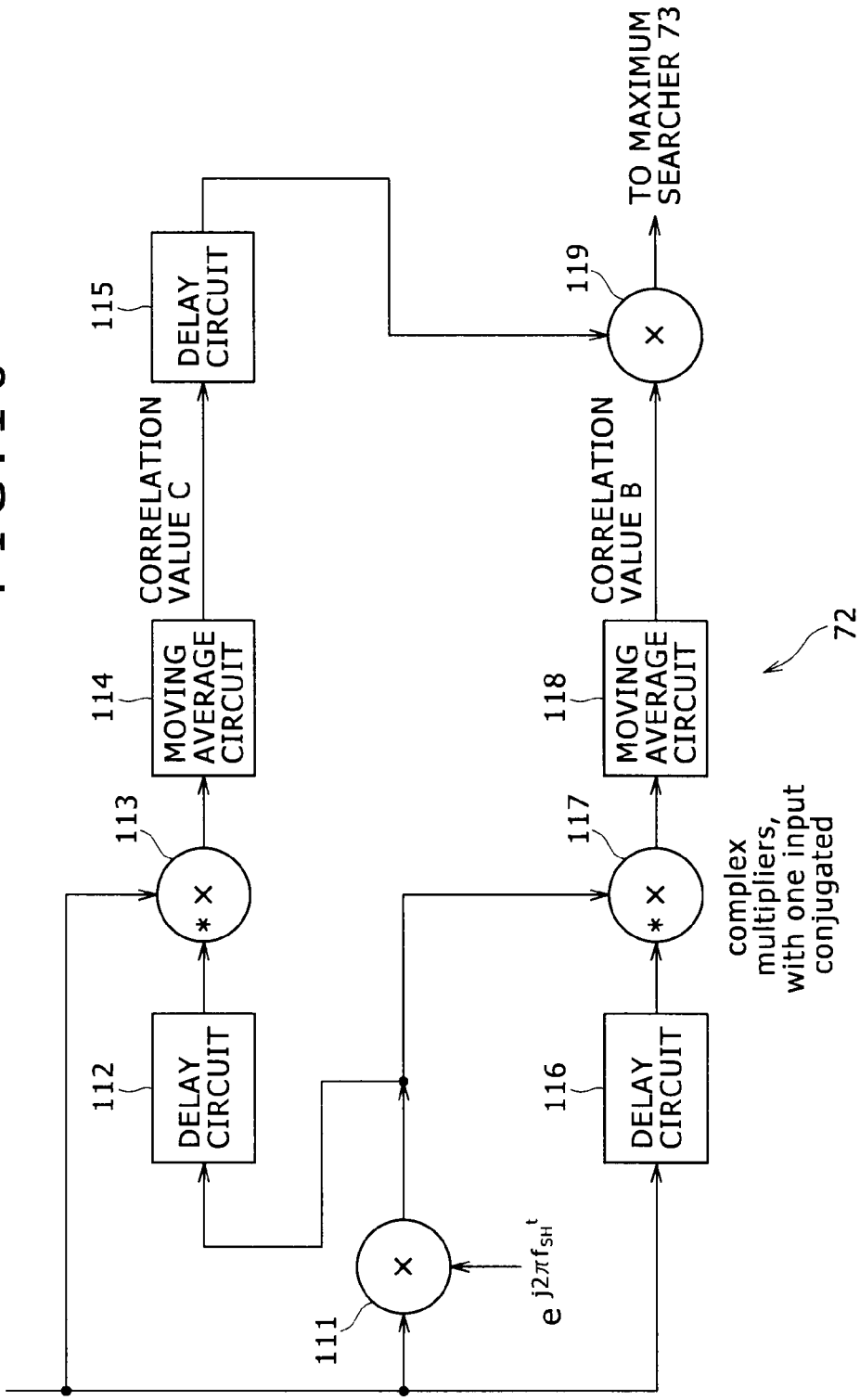
FIG. 10 is a block diagram showing a detailed composition example of an inverse correlator.

FIG. 10 is a block diagram showing a detailed composition example of the inverse correlator 72.

The inverse correlator 72 in FIG. 10 is made up of a frequency shifter 111, a delay circuit 112, a multiplier 113, a moving average circuit 114, a delay circuit 115, a delay circuit 116, a multiplier 117, a moving average circuit 118, and a multiplier 119. The components of the inverse correlator 72 are the same as those of the correlator 71 in FIG. 7 except for the frequency shifter 111 replacing the frequency shifter 91 of the correlator 71. The descriptions of the components common to the two correlators will be omitted hereunder where redundant.

The frequency shifter 111 multiplies the signal fed from the orthogonal demodulation section 55 in FIG. 5 and composed of the I and Q components by $e^{-j2\pi f_{SH} t}$, thereby raising the frequency of the signal by the frequency $f_{SH}$. With this multiplication performed, if the signal coming from the orthogonal demodulation section 55 is a P1 signal with spectrum inversion occurring therein, then the frequency of the overlay parts C and B in the P1 signal becomes the same as the original frequency of the real information part A in that P1 signal. As a result, the correlation value output from the inverse correlator 72 takes the value indicated in FIG. 9.

The frequency shifter 111 sends a signal with its frequency raised by the frequency $f_{SH}$ to the delay circuit 112 and multiplier 117.

[Another Detailed Composition Example of the Inverse Correlator]

Figure 11:
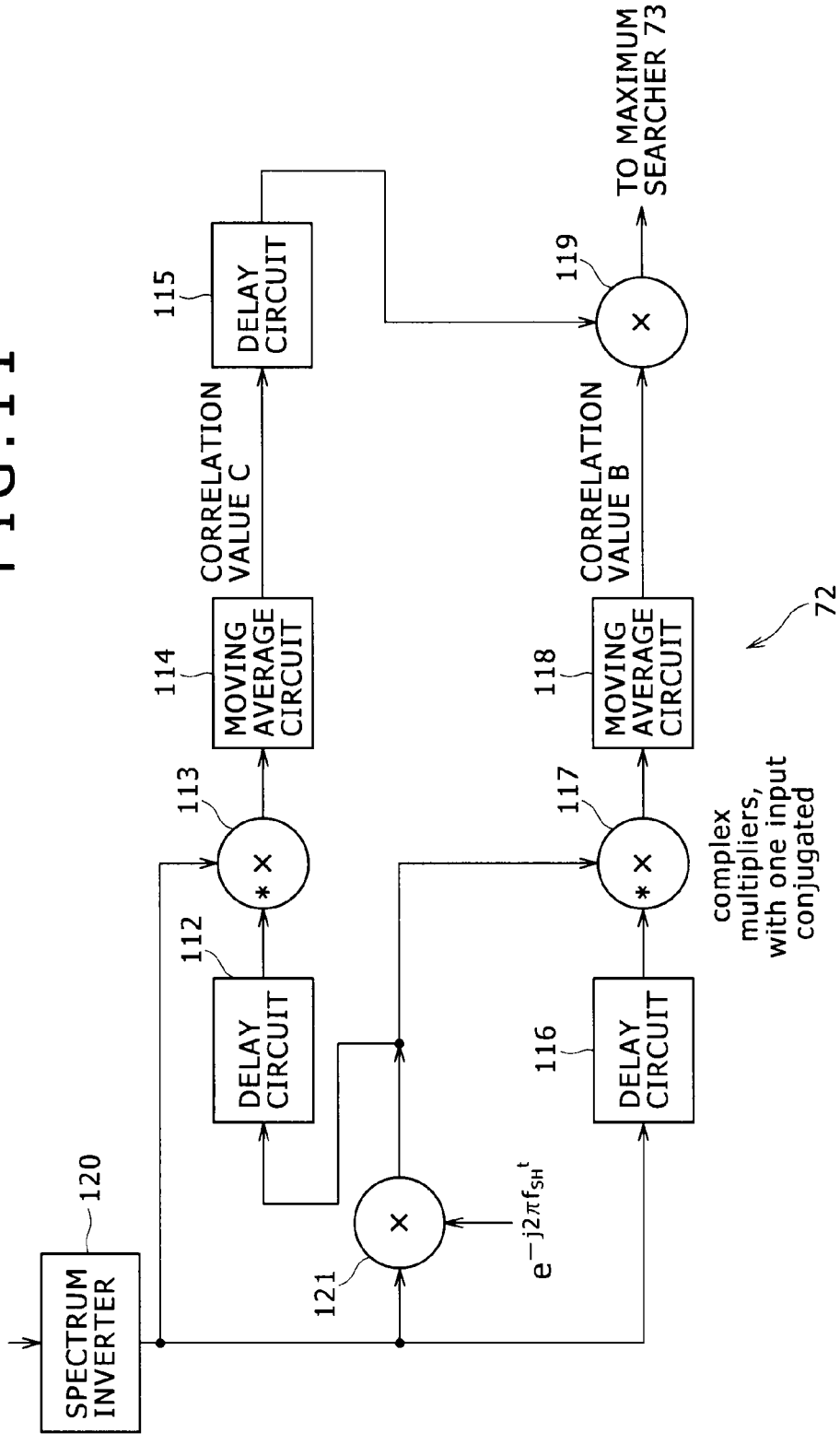
FIG. 11 is a block diagram showing another detailed composition example of the inverse correlator.

FIG. 11 is a block diagram showing another detailed composition example of the inverse correlator 72.

Of the components of the structure shown in FIG. 11, those also found in the setup of FIG. 10 are designated by like reference numerals, and their descriptions will be omitted hereunder where redundant.

The composition of the inverse correlator 72 in FIG. 11 differs from the structure in FIG. 10 mainly in that a spectrum inverter 120 is added anew and that a frequency shifter 121 is adopted to replace the frequency shifter 111. The inverse correlator 72 in FIG. 11 performs a spectrum inversion process on the signal fed from the orthogonal demodulation section 55, and processes the resulting signal in the same manner as the correlator 71.

More specifically, the spectrum inverter 120 of the inverse correlator 72 in FIG. 11 performs the spectrum inversion process on the signal supplied from the orthogonal demodulation section 55 and composed of the I and Q components. The signal resulting from the spectrum inversion process is sent to the multiplier 113, frequency shifter 121, and delay circuit 116.

The frequency shifter 121 multiplies the signal from the spectrum inverter 120 by $e^{-2\pi f_{SH} t}$, thereby lowering the frequency of the signal by the frequency $f_{SH}$. With this multiplication carried out, if the signal coming from the orthogonal demodulation section 55 is a P1 signal with spectrum inversion occurring therein, then the frequency of the overlay parts C and B in the signal obtained by performing the spectrum inversion process on the P1 signal becomes the same as the original frequency of the real information part A in the P1 signal. As a result, the correlation value output from the inverse correlator 72 takes the value indicated in FIG. 9.

The frequency shifter 121 sends a signal with its frequency lowered by the frequency $f_{SH}$ to the delay circuit 112 and multiplier 117.

[Explanation of the Maximum Searcher]

Figure 12:
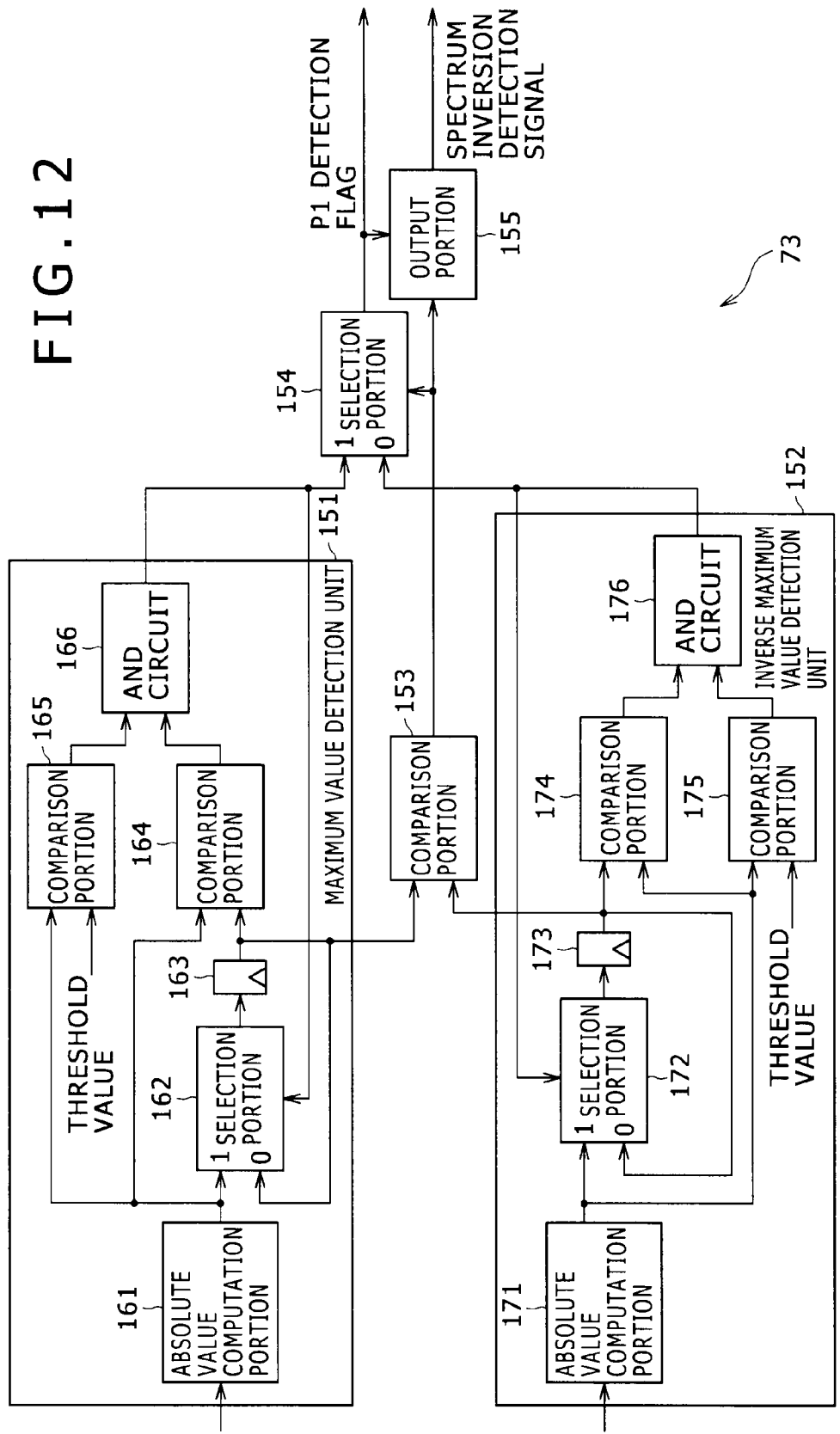
FIG. 12 is a block diagram showing a detailed composition example of a maximum searcher.

FIG. 12 is a block diagram showing a detailed composition example of the maximum searcher 73 in FIG. 6.

As shown in FIG. 12, the maximum searcher 73 is made up of a maximum value detection unit 151, an inverse maximum value detection unit 152, a comparison portion 153, a selection portion 154, and an output portion 155.

The maximum value detection unit 151 is constituted by an absolute value computation portion 161, a selection portion 162, a register 163, a comparison portion 164, a comparison portion 165, and an AND circuit 166. The maximum value detection unit 151 detects a maximum value of the correlation value fed from the correlator 71 in FIG. 6 and composed of the I and Q components.

The absolute value computation portion 161 obtains an absolute value of the correlation value supplied from the correlator 71 and composed of the I and Q components. The absolute value thus acquired is sent to the selection portion 162 and comparison portions 164 and 165.

Based on the P1 detection flag fed from the AND circuit 166, the selection portion 162 selects one of two absolute values: the absolute value supplied from the absolute value computation portion 161, or the maximum absolute value output from the register 163 and in effect at present. The selection portion 162 feeds the selected absolute value to the register 163.

The register 163 receives the absolute value from the selection portion 162 and stores the received value as the maximum absolute value at present. The register 163 feeds the stored absolute value to the selection portion 162 and comparison portions 164 and 153. Also, the register 163 resets the retained absolute value to zero in response to the enable flag output from the decoding block 78 (FIG. 6).

The comparison portion 164 compares the absolute value coming from the absolute value computation portion 161 with the maximum absolute value in effect at present and coming from the register 163. The result of the comparison is sent from the comparison portion 164 to the AND circuit 166.

The comparison portion 165 compares the absolute value from the absolute value computation portion 161 with an externally input threshold value, and supplies the result of the comparison to the AND circuit 166. The threshold value is placed beforehand in a memory, not shown, illustratively within the P1 decoding process section 57.

If the result of the comparison coming from the comparison portion 164 indicates that the maximum value is equal to or larger than the maximum absolute value in effect at present, and if the result of the comparison from the comparison portion 165 indicates that the maximum value is equal to or larger than the threshold value, then the AND circuit 166 outputs a High-level signal denoting the detection of the P1 signal as a P1 detection flag. That is, where the absolute value is found to be the maximum absolute value at present and equal to or larger than the threshold value, the AND circuit 166 outputs a High-level signal as the P1 detection flag.

Otherwise, the AND circuit 166 outputs a Low-level signal indicating the absence of the P1 signal as the P1 detection flag.

The inverse maximum value detection unit 152 is made up of an absolute value computation portion 171, a selection portion 172, a register 173, comparison portions 174 and 175, and an AND circuit 176. The inverse maximum value detection unit 152 detects a maximum value of the correlation value fed from the inverse correlator 72 and composed of the I and Q components.

The inverse maximum value detection unit 152 is the same as the maximum value detection unit 151 in terms of composition and functionality except that what is targeted to be processed is the correlation value supplied from the inverse correlator 72. For that reason, the inverse maximum value detection unit 152 will not be discussed further.

The comparison portion 153 compares the absolute value supplied from the register 163 of the maximum value detection unit 151, with the absolute value from the register 173 of the inverse maximum value detection unit 152.

If the absolute value from the register 163 is found to be larger than the absolute value from the register 173 as a result of the comparison, the comparison portion 153 outputs a spectrum inversion detection signal indicating the absence of spectrum inversion to the selection portion 154 and output portion 155. If the absolute value from the register 173 is found larger than the absolute value from the register 163, then the comparison portion 153 outputs a spectrum inversion detection signal indicating the occurrence of spectrum inversion to the selection portion 154 and output portion 155.

In accordance with the spectrum inversion detection signal fed from the comparison portion 153, the selection portion 154 selects one of two flags: a P1 detection flag from the AND circuit 166 of the maximum value detection unit 151, or a P1 detection flag from the AND circuit 176 of the inverse maximum value detection unit 152. The selection portion 154 supplies the selected P1 detection flag to the output portion 155 and FFT computation block 76 (FIG. 6).

In keeping with the level of the P1 detection flag coming from the selection portion 154, the output portion 155 outputs the spectrum inversion detection signal fed from the comparison portion 153 to the selector 75 (FIG. 6) and selector 59 (FIG. 5). More specifically, if the P1 detection flag is found to be High, i.e., if the P1 signal is found detected, the output portion 155 outputs the spectrum inversion detection signal. That is, the spectrum inversion detection signal output from the output portion 155 is a signal that indicates the occurrence or absence of the spectrum inversion to be detected using the P1 signal.

[Explanation of the Process of the Reception System]

Figure 13:
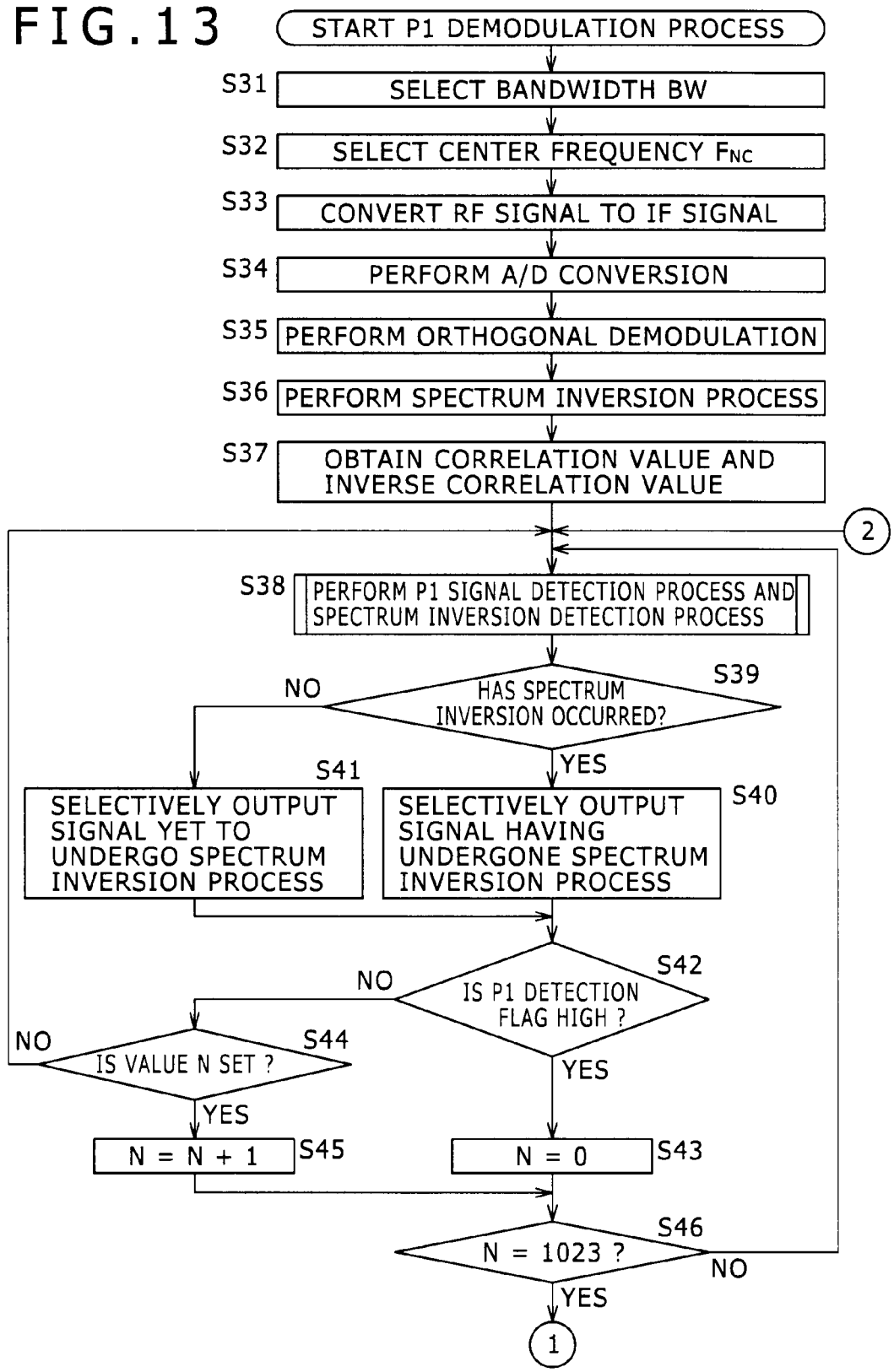
FIG. 13 is a flowchart explanatory of a P1 demodulation process performed by the reception system.
Figure 14:
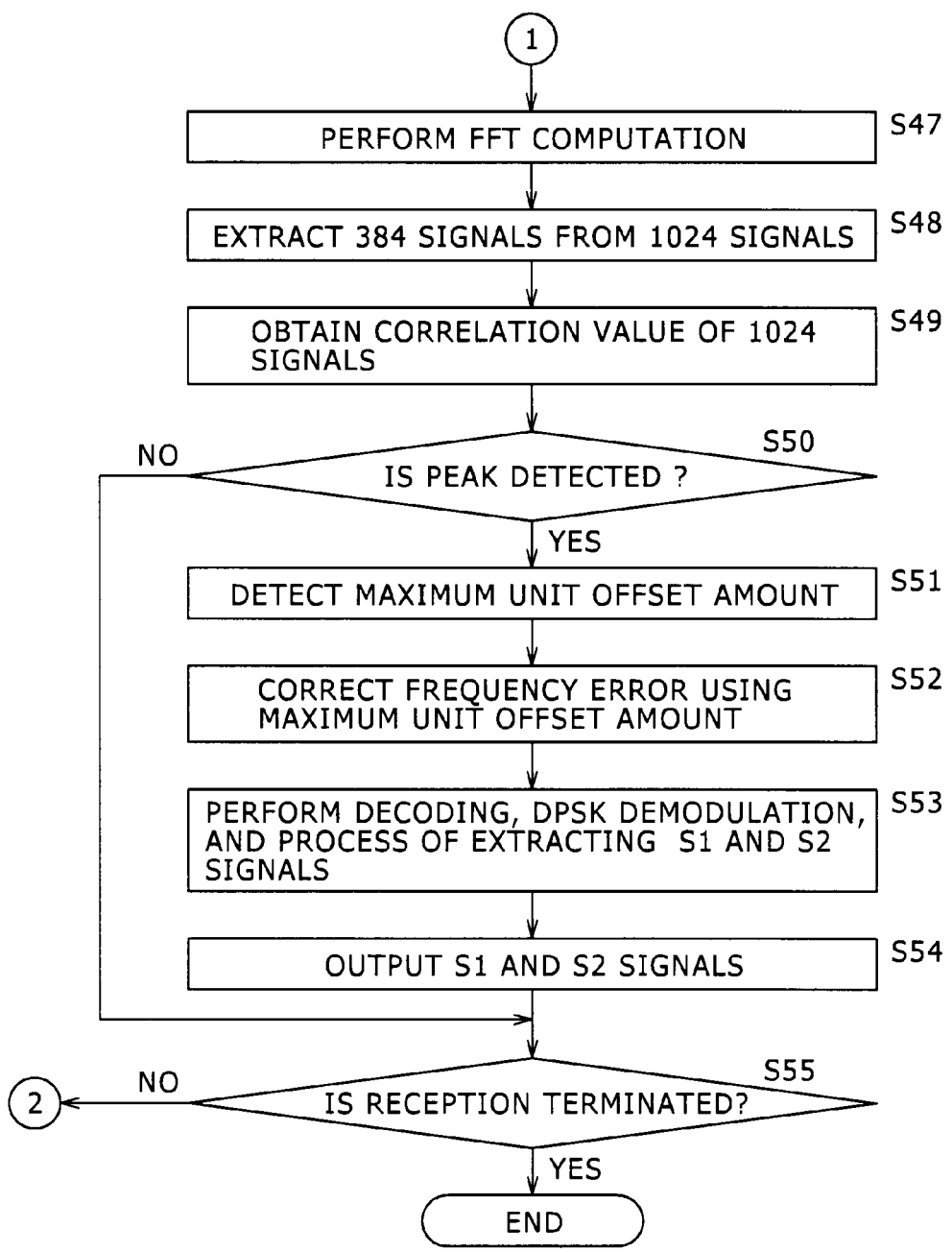
FIG. 14 is another flowchart explanatory of the P1 demodulation process performed by the reception system.

FIGS. 13 and 14 are flowcharts explanatory of the P1 decoding process performed by the reception system 50 in FIG. 5.

In step S31, the local oscillators 53 and 56 in FIG. 5 select the bandwidth BW. In step S32, the local oscillator 53 selects the center frequency $F_{NC}$. In step S33, the frequency conversion section 52 multiplies the RF signal received via the antenna 51 by the carrier having the oscillation frequency ($F_{NC}$+BW) supplied by the local oscillator 53, thereby converting the RF signal into an IF signal having the center frequency $F_{NC}$. The frequency conversion section 52 sends the IF signal thus acquired to the A/D conversion section 54.

In step S34, the A/D conversion section 54 performs A/D conversion of the IF signal coming from the frequency conversion section 52. The resulting IF signal in digital form is forwarded from the A/D conversion section 54 to the orthogonal demodulation section 55.

In step S35, the orthogonal demodulation section 55 orthogonally demodulates the IF signal from the A/D conversion section 54 using the carrier supplied from the local oscillator 56. The orthogonal demodulation section 55 sends the signal resulting from the orthogonal demodulation and composed of the I and Q components to the P1 decoding process section 57, spectrum inverter 58, and selector 59.

In step S36, the spectrum inverter 74 (FIG. 6) of the P1 decoding process section 57 performs a spectrum inversion process on the signal fed from the orthogonal demodulation section 55 and composed of the I and Q components.

In step S37, the correlator 71 (FIG. 6) obtains a correlation value of the signal fed from the orthogonal demodulation section 55 and composed of the I and Q components on the assumption that spectrum inversion has not occurred in the signal. The correlator 71 sends the correlation value thus acquired to the maximum searcher 73. Also, the inverse correlator 72 acquires a correlation value of the signal supplied form the orthogonal demodulation section 55 and composed of the I and Q components on the assumption that spectrum inversion has occurred in the signal. The inverse correlator 72 forwards the correlation value thus obtained to the maximum searcher 73.

In step S38, the maximum searcher 73 carries out a P1 signal detection process and a spectrum inversion detection process. The P1 signal detection process and spectrum inversion detection process will be discussed later in more detail by reference to FIG. 15.

In step S39, the selector 75 checks to determine whether spectrum inversion has occurred using the spectrum inversion detection signal fed from the maximum searcher 73 as a result of the P1 signal detection process and spectrum inversion detection process in step S38.

If in step S39 spectrum inversion is found to have occurred, i.e., if the spectrum inversion detection signal indicates the occurrence of spectrum inversion, then control is passed on to step S40. In step S40, the selector 75 selects the signal on which the spectrum inversion process is performed by the spectrum inverter 74 and outputs the selected signal to the FFT computation block 76. From step S40, control is passed on to step S42.

If in step S39 spectrum inversion is not found to have occurred, i.e., if the spectrum inversion detection signal indicates the absence of spectrum inversion, then control is passed on to step S41. In step S41, the selector 75 selectively outputs to the FFT computation block 76 the signal which has yet to undergo the spectrum inversion process and which is supplied from the orthogonal demodulation section 55. From step S41, control is passed on to step S42.

In step S42, the FFT computation block 76 checks to determine whether the P1 detection flag fed from the maximum searcher 73 as the result of the P1 signal detection process and spectrum inversion detection process in step S38 is High. If in step S42 the P1 detection flag is found to be High, then step S43 is reached. In step S43, the FFT computation block 76 sets to 0 the number N to be attached to the signal supplied from the selector 75. That is, the FFT computation block 76 resets the FFT computation process. From step S43, control is passed on to step S46.

If in step S42 the P1 detection flag is not found to be High, i.e., if the P1 detection flag is found Low, then control is passed on to step S44.

In step S44, the FFT computation block 76 checks to determine whether the number N is being set. If the number N is not found to be set, then control is returned to step S38. Steps S38 through S42 and step S44 are repeated until the P1 detection flag is found to be High.

If in step S44 the number N is found to be set, then step S45 is reached. In step S45, the FFT computation block 76 increments the number N by 1 and goes to step S46.

In step s46, the FFT computation block 76 checks to determine whether the number N is 1,023. If in step S46 the number N is not found to be 1,023, then control is returned to step S38. Steps S38 through S46 are then repeated until the number N becomes 1,023.

As described, if the level of the P1 detection flag becomes High before the number N reaches 1,023, then the FFT computation block 76 resets the FFT computation process. As a result, even if the P1 signal is transmitted in a multipath environment where pre-echo exists, the dominant wave of the P1 signal can be subjected to FFT computation.

If in step S46 the number N is found to be 1,023, then step S47 in FIG. 14 is reached. In step S47, the FFT computation block 76 performs FFT computation of the signals with the numbers ranging from 0 to 1,023. The resulting 1,024 data signals are forwarded from the FFT computation block 76 to the CDS correlator 77. Also, the FFT computation block 76 supplies a symbol start signal to the CDS correlator 77.

In step S48, the CDS correlator 77 extracts 384 data signals from the 1,024 data signals fed from the FFT computation block 76, by reference to the effective carrier numbers stored in the internal memory. The CDS correlator 77 sends the extracted 384 data signals to the decoding block 78.

In step S49, the CDS correlator 77 obtains a correlation value of the 1,024 data signals coming from the FFT computation block 76.

In step S50, the CDS correlator 77 checks to determine whether a peak of the correlation value is detected. If the peak of the correlation value is found to be detected, then control is passed on to step S51.

In step S51, the CDS correlator 77 detects the maximum unit offset amount $F_{offset}$ based on the peak of the correlation value. The detected offset amount is sent from the CDS correlator 77 to the local oscillator 53.

In step S52, the local oscillator 53 changes the center frequency $F_{NC}$ to $F_{NC}+F_{offset}$ using the maximum unit offset amount $F_{offset}$. This step thus corrects the carrier-by-carrier frequency error of the DVB-T2 signal.

In step S53, the decoding block 78 performs decoding and DBPSK demodulation of the 384 data signals fed from the CDS correlator 77. The decoding block 78 also extracts the S1 and S2 signals from the received signals.

In step S54, the decoding block 78 outputs the S1 and S2 signals as well as an enable flag. In response to the enable flag, the registers 163 and 173 (FIG. 12) of the maximum searcher 73 are reset to 0. Also, the S1 and S2 signals output in step S54 are used by the data decoding process section 60. From step S54, control is passed on to step S55.

If in step S50 the peak of the correlation value is not found to be detected, then control is passed on to step S55.

In step S55, the maximum searcher 73 checks to determine whether the reception via the antenna 51 is terminated, i.e., whether the correlation values have stopped being input from the correlator 71 and inverse correlator 72. If in step S55 the reception via the antenna 51 is not found to be terminated, then control is returned to step S38 in FIG. 13. Steps S38 through S55 are repeated until the reception via the antenna 51 has come to an end.

If in step S55 the reception via the antenna 51 is found to be terminated, then the process is brought to an end.

Figure 15:
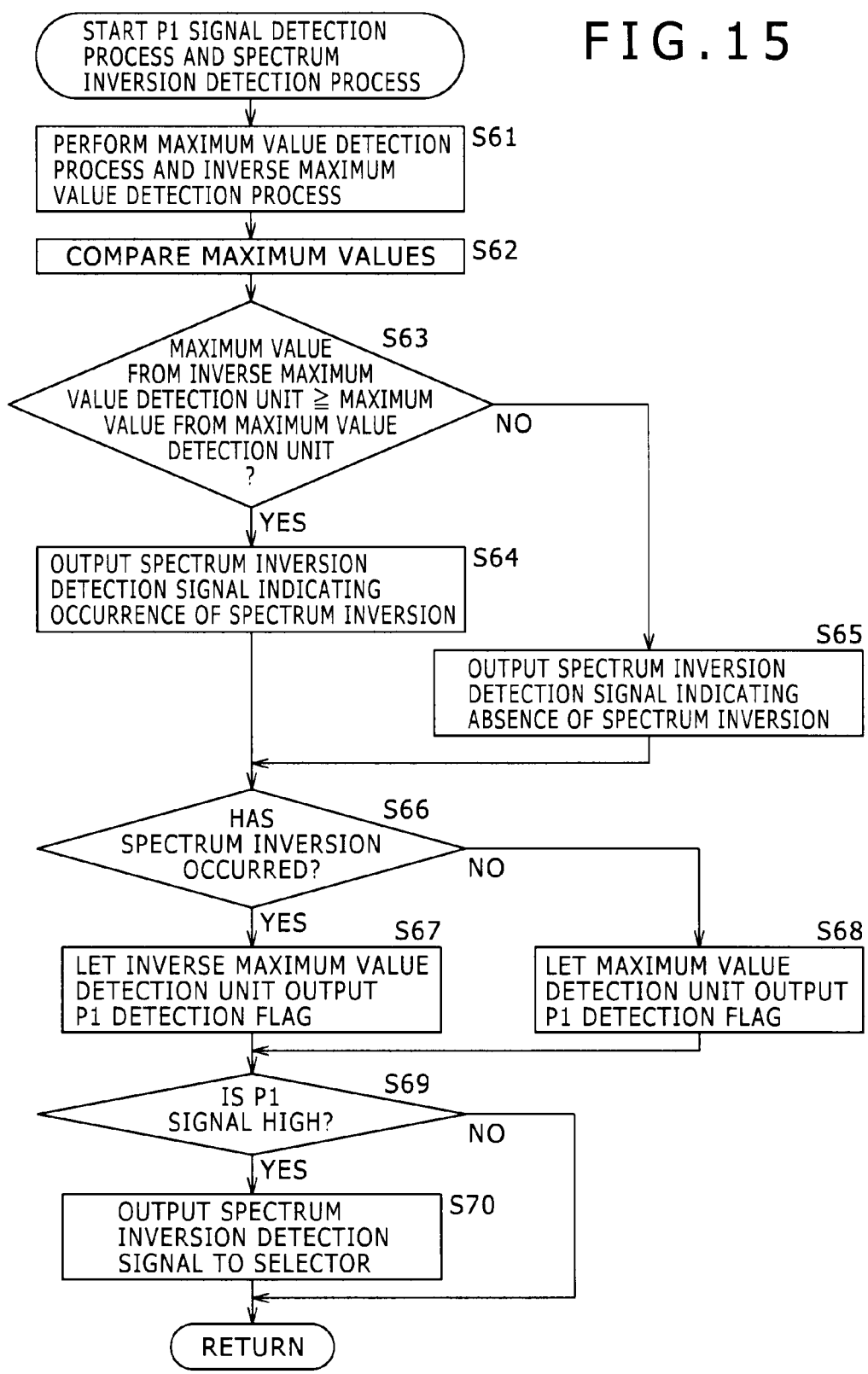
FIG. 15 is a flowchart explanatory of a P1 signal detection process and a spectrum inversion detection process carried out in step S38 of FIG. 13.

FIG. 15 is a flowchart explanatory of the P1 signal detection process and spectrum inversion detection process carried out in step S38 of FIG. 13.

In step S61, the maximum value detection unit 151 (FIG. 12) of the maximum searcher 73 performs a maximum value detection process that detects a maximum value of the correlation value fed from the correlator 71. Also, the inverse maximum value detection unit 152 performs an inverse maximum value detection process that detects a maximum value of the correlation value supplied from the inverse correlator 72.

The maximum value detection process will be explained later in more detail by reference to FIG. 16. The inverse maximum value detection process is the same as the maximum value detection process except that the correlation value targeted to be processed is supplied not from the correlator 71 but from the inverse correlator 72. For that reason, detailed descriptions of the inverse maximum value detection process will be omitted hereunder where redundant.

In step S62, the comparison portion 153 compares the maximum value fed from the maximum value detection unit 151 following the maximum value detection process in step S61 with the maximum value supplied from the inverse maximum value detection unit 152 following the inverse maximum value detection process in step S61.

In step S63, the comparison portion 164 checks to determine whether the maximum value from the inverse maximum value detection unit 152 is equal to or larger than the maximum value from the maximum value detection unit 151.

If in step S63 the maximum value from the inverse maximum value detection unit 152 is found to be equal to or larger than the maximum value from the maximum value detection unit 151, then control is passed on to step S64. In step S64, the comparison portion 164 outputs the spectrum inversion detection signal indicating the occurrence of spectrum inversion to the selection portion 154 and output portion 155. From step S64, control is passed on to step S66.

If in step S63 the maximum value from the inverse maximum value detection unit 152 is found to be smaller than the maximum value from the maximum value detection unit 151, then control is passed on to step S65. In step S65, the comparison portion 164 outputs the spectrum inversion detection signal indicating the absence of spectrum inversion to the selection portion 154 and output portion 155. From step S65, control is passed on to step S66.

In step S66, the selection portion 154 checks to determine whether spectrum inversion has occurred in accordance with the spectrum inversion detection signal supplied from the comparison portion 153. If in step S66 spectrum inversion is found to have occurred, i.e., if the spectrum inversion detection signal indicates the occurrence of spectrum inversion, then control is passed on to step S67.

In step S67, the selection portion 154 selects the P1 detection flag supplied from the inverse maximum value detection unit 152 following the inverse maximum value detection process, and outputs the selected P1 detection flag to the output portion 155 and FFT computation block 76. From step S67, control is passed on to step S69.

If in step S66 spectrum inversion is not found to have occurred, i.e., if the spectrum inversion detection signal indicates the absence of spectrum inversion, then control is passed on to step S68.

In step S68, the selection portion 154 selects the P1 detection flag fed from the maximum value detection unit 151 following the maximum value detection process, and outputs the selected P1 detection flag to the output portion 155 and FFT computation block 76. From step S68, control is passed on to step S69.

In step S69, the output portion 155 checks to determine whether the level of the P1 signal coming from the selection portion 154 is High. If in step S69 the level of the P1 signal is found to be High, then control is passed on to step S70.

In step S70, the output portion 155 outputs the spectrum inversion detection signal supplied from the comparison portion 153 to the selector 75 (FIG. 6) and selector 59 (FIG. 5).

If the spectrum inversion detection signal indicates the occurrence of spectrum inversion, the selectors 75 and 59 selectively output the signal on which the spectrum inversion process is performed. If the spectrum inversion detection signal indicates the absence of spectrum inversion, then the selectors 75 and 59 selectively output the signal on which the spectrum inversion process has yet to be carried out.

As a result, where the spectrum inversion detection signal indicates the occurrence of spectrum inversion, the P1 signal having undergone the spectrum inversion process downstream of the selector 75 in the P1 decoding process section 57 is demodulated; the data decoding process section 60 demodulates the P2 and data signals on which the spectrum inversion process was performed. Where the spectrum inversion detection signal indicates the absence of spectrum inversion, the P1 signal yet to undergo the spectrum inversion process downstream of the selector 75 is demodulated; the data decoding process section 60 demodulates the P2 and data signals on which the spectrum inversion process has yet to be carried out.

That is, if the received DVB-T2 signal is found to have spectrum inversion occurring therein in the reception system 50, then the DVB-T2 signal is subjected to the spectrum inversion process before being demodulated. If the received DVB-T2 signal is found to have no spectrum inversion occurring therein, the signal is demodulated as is. In this manner, the reception system 50 allows the received DVB-T2 signal to be correctly demodulated even if spectrum inversion occurs in that signal.

After step S70 is carried out, or if in step S69 the P1 signal is found to be not High but Low, control is returned to step S38 in FIG. 13. From step S38, control is passed on to step S39.

Figure 16:
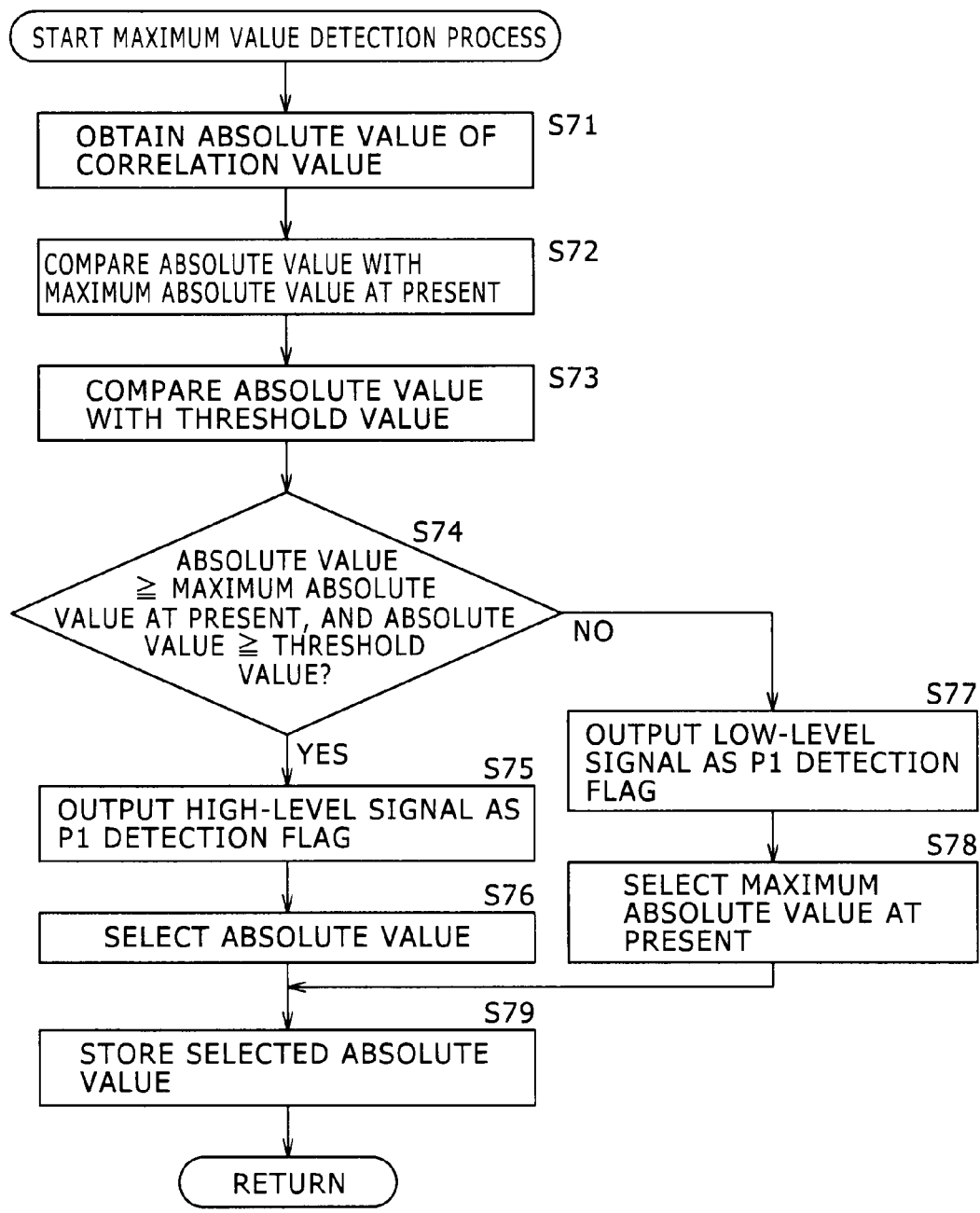
FIG. 16 is a flowchart explanatory of a maximum value detection process carried out in step S61 of FIG. 15.

FIG. 16 is a flowchart explanatory of the maximum value detection process carried out by the maximum value detection unit 151 in step S61 of FIG. 15.

In step S71, the absolute value computation portion 161 obtains an absolute value of the correlation value fed from the correlator 71 and composed of the I and Q components. The absolute value computation portion 161 feeds the absolute value thus acquired to the selection portion 162 and comparison portions 164 and 165.

In step S72, the comparison portion 164 compares the absolute value coming from the absolute value computation portion 161 with the maximum absolute value at present supplied from the register 163. The result of the comparison is sent from the comparison portion 164 to the AND circuit 166.

In step S73, the comparison portion 165 compares the absolute value from the absolute value computation portion 161 with an externally input threshold value. The comparison portion 165 sends the result of the comparison to the AND circuit 166.

In step S74, the AND circuit 166 checks to determine whether the absolute value is equal to or larger than the maximum absolute value at present and whether the absolute value is equal to or larger than the threshold value, on the basis of the results of the comparisons coming from the comparison portions 164 and 165.

If the absolute value is found to be equal to or larger than the maximum absolute value at present and if the absolute value is also found equal to or larger than the threshold value in step S74, then control is passed on to step S75. In step S75, the AND circuit 166 outputs a High-level signal as the P1 detection flag to the selection portion 154. If the spectrum inversion detection signal indicates the absence of spectrum inversion, this P1 detection flag is selected by the selection portion 154.

In step S76, the selection portion 162 selects the absolute value supplied from the absolute value computation portion 161 and sends the selected absolute value to the register 163. From step S76, control is passed on to step S79.

If the absolute value is found to be smaller than the maximum absolute value at present or if the absolute value is found smaller than the threshold value in step S74, then control is passed on to step S77. In step S77, the AND circuit 166 outputs a Low-level signal as the P1 detection flag to the selection portion 154. If the spectrum inversion detection signal indicates the absence of spectrum inversion, this P1 detection flag is selectively output by the selection portion 154.

In step S78, the selection portion 162 selects the maximum absolute value at present supplied from the register 163 and feeds the selected absolute value to the register 163. From step S78, control is passed on to step S79.

In step S79, the register 163 stores the absolute value from the selection portion 162 as the maximum absolute value at present. This absolute value is sent to the selection portion 162 and comparison portion 164.

As described above, the reception system 50 detects the occurrence or absence of spectrum inversion using the P1 signal. If spectrum inversion is detected to have occurred, the received signal having undergone the spectrum inversion process is demodulated. If spectrum inversion is detected to be absent, then the received signal yet to undergo the spectrum inversion process is demodulated. Thus the P1 signal is correctly demodulated so that the S1 and S2 signals necessary for frame demodulation can be obtained. Also, the P2 and data signals are correctly demodulated using the S1 and S2 signals and based on the detected occurrence or absence of spectrum inversion.

Furthermore, the reception system 50 calculates correlation values of the DVB-T2 signal and detects from these values the maximum correlation value in absolute terms at present. Every time such a maximum value is detected, the FFT computation process for the DVB-T2 signal is reset. This makes it possible to detect the P1 signal on the assumption that the position where the correlation value is the largest in the DVB-T2 signal is the position at which the P1 signal is to be detected.

[Another Detailed Composition Example of the Maximum Searcher]

Figure 17:
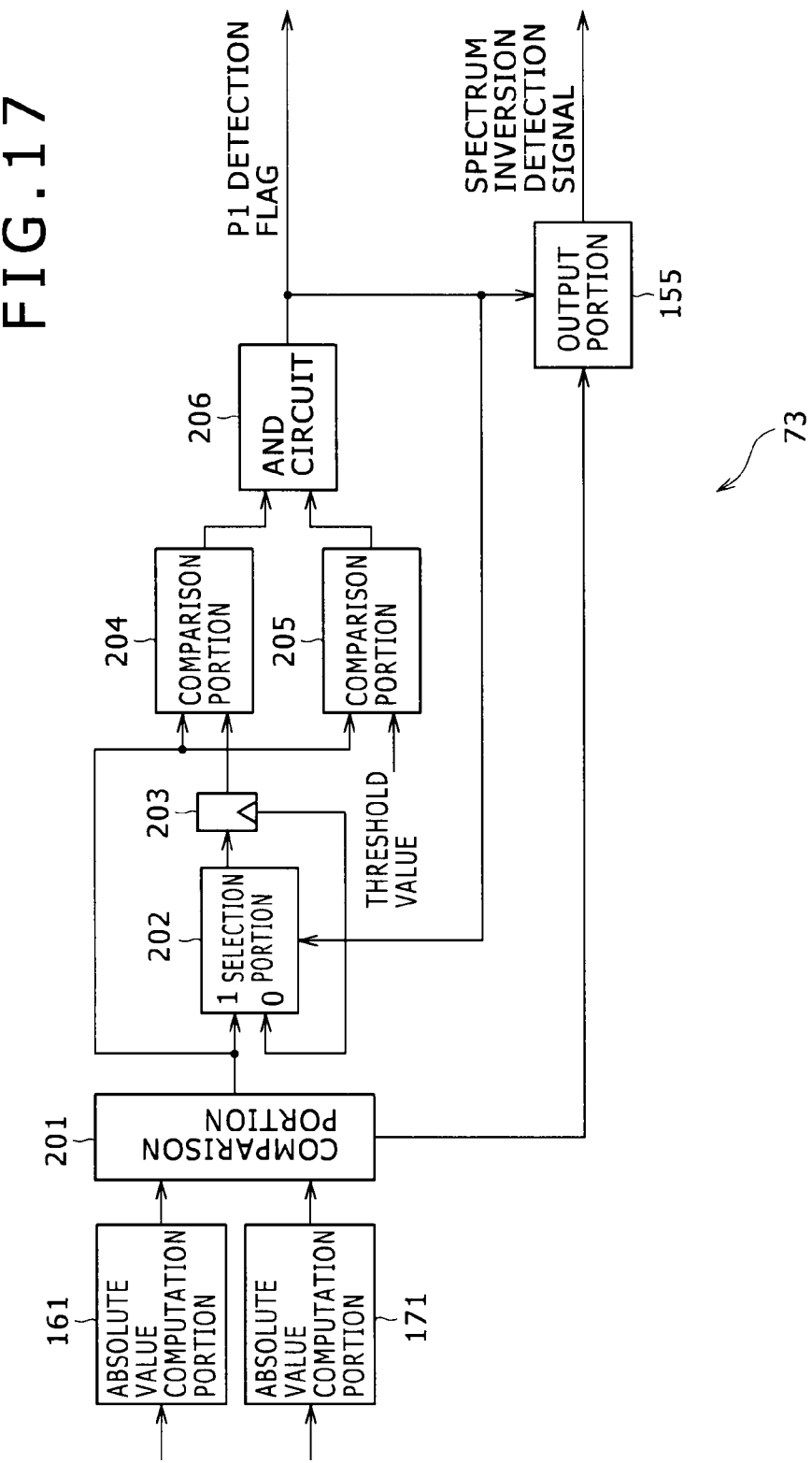
FIG. 17 is a block diagram showing another detailed composition example of the maximum searcher.

FIG. 17 is a block diagram showing another detailed composition example of the maximum searcher 73.

The maximum searcher 73 in FIG. 17 is made up of absolute value computation portions 161 and 162, a comparison portion 201, a selection portion 202, a register 203, comparison portions 204 and 205, an AND circuit 206, and an output portion 155.

Of the components shown in FIG. 17, those also found in FIG. 12 are designated by like reference numerals, and their descriptions will be omitted hereunder where redundant.

The maximum searcher 73 in FIG. 17 detects the largest of the correlation values output from both the correlator 71 and the inverse correlator 72, and outputs a P1 detection flag.

More specifically, the comparison portion 201 compares the absolute value of the correlation value coming from the correlator 71 via the absolute value computation portion 161, with the absolute value of the correlation value sent from the inverse correlator 72 via the absolute value computation portion 171.

If the absolute value of the correlation value from the inverse correlator 72 is found equal to or larger than the absolute value of the correlation value from the correlator 71 as a result of the comparison, then the comparison portion 201 outputs to the output portion 155 the spectrum inversion detection signal indicating the occurrence of spectrum inversion. At this point, the comparison portion 201 outputs to the selection portion 202 the absolute value of the correlation value supplied from the inverse correlator 72.

By contrast, if the absolute value of the correlation value from the inverse correlator 72 is found smaller than the absolute value of the correlation value from the correlator 71, then the comparison portion 201 outputs to the output portion 155 the spectrum inversion detection signal indicating the absence of spectrum inversion. At this point, the comparison portion 201 outputs to the selection portion 202 the absolute value of the correlation value fed from the correlator 71.

The selection portion 202 selects either the absolute value supplied from the comparison portion 201 or the maximum absolute value at present output from the register 203, in keeping with the P1 detection flag coming from the AND circuit 206. The selection portion 202 feeds the selected absolute value to the register 203.

The register 203 stores the absolute value sent from the selection portion 202 as the maximum absolute value in effect at present. The register 203 also sends the retained absolute value to the selection portion 202 and comparison portion 204. Furthermore, the register 203 resets the retained absolute value to 0 in response to the enable flag output from the decoding block 78 (FIG. 6).

The comparison portion 204 compares the absolute value fed from the comparison portion 201 with the maximum absolute value at present supplied from the register 203. The result of the comparison is sent from the comparison portion 204 to the AND circuit 206.

The comparison portion 205 compares the absolute value from the comparison portion 201 with an externally input threshold value. The result of the comparison is sent from the comparison portion 205 to the AND circuit 206. The threshold value is kept beforehand illustratively in a memory, not shown, within the P1 decoding process section 57.

If the result of the comparison coming from the comparison portion 204 indicates that the absolute value is equal to or larger than the maximum absolute value at present and if the result of the comparison from the comparison portion 205 shows that the absolute value is equal to or larger than the threshold value, then the AND circuit 206 outputs a High-level signal as the P1 detection flag to the output portion 155 and FFT computation block 76 (FIG. 6). Otherwise, the AND circuit 206 outputs a Low-level signal as the P1 detection flag to the output portion 155 and FFT computation block 76.

<Second Embodiment>

Figure 18:
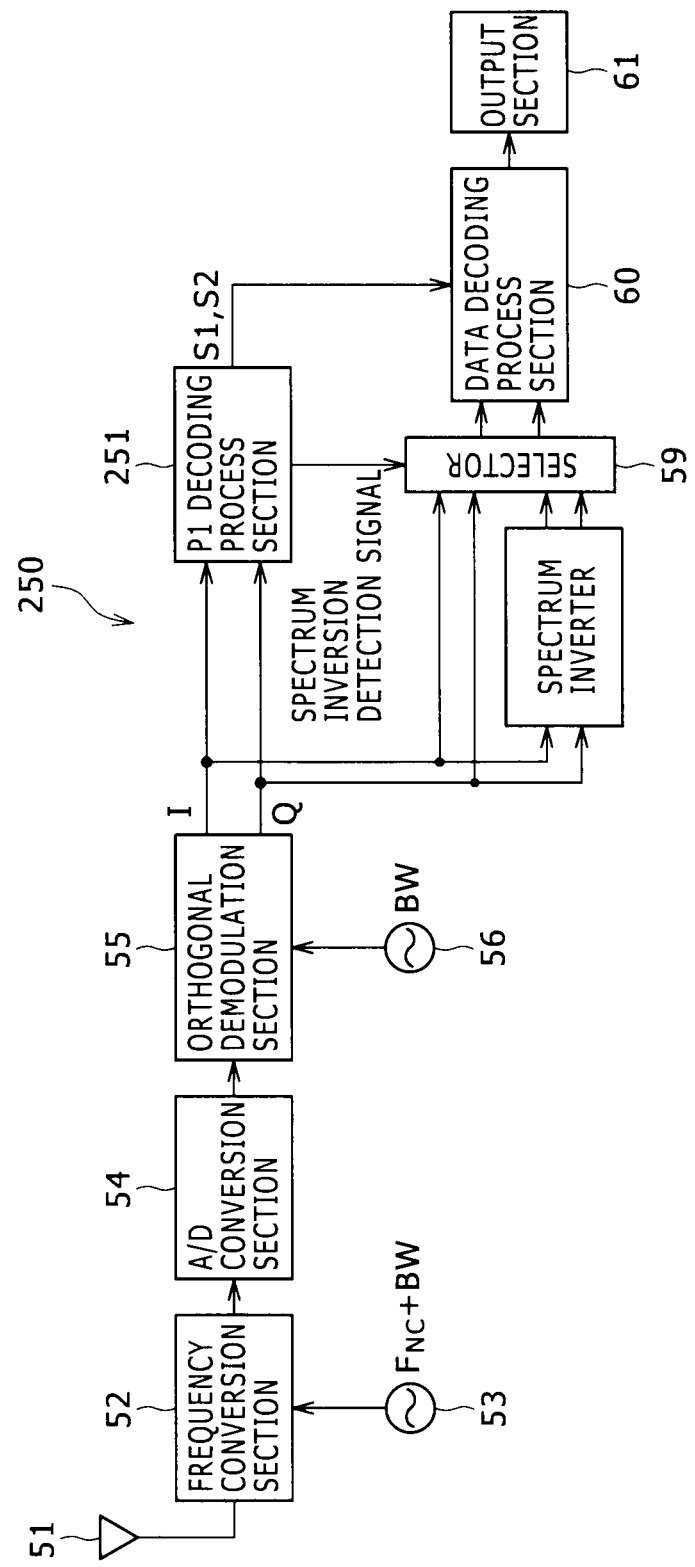
FIG. 18 is a block diagram showing a configuration example of a reception system as a second embodiment of the present invention.

FIG. 18 is a block diagram showing a configuration example of a reception system as the second embodiment of the present invention.

Of the components shown in FIG. 18, those also found in FIG. 5 are designated by like reference numerals, and their descriptions will be omitted hereunder where redundant.

The configuration of the reception system 250 in FIG. 18 is substantially the same as the configuration in FIG. 5 except that a P1 decoding process section 251 is installed to replace the P1 decoding process section 57. The reception system 250 utilizes a single correlator for detecting the occurrence or absence of spectrum inversion.

More specifically, the P1 decoding process section 251 performs on a time-sharing basis two processes: an inversion-present P1 detection process for detecting the P1 signal on the assumption that the signal fed from the orthogonal demodulation section 55 has spectrum inversion occurring therein, and an inversion-absent P1 detection process for detecting the P1 signal on the assumption that the signal coming from the orthogonal demodulation section 55 has no spectrum inversion occurring therein.

When performing the inversion-present P1 detection process, the P1 decoding process section 251 generates a spectrum inversion detection signal indicating the occurrence of spectrum inversion. When carrying out the inversion-absent P1 detection process, the P1 decoding process section 251 proceeds with a spectrum inversion detection process for generating a spectrum inversion detection signal indicating the absence of spectrum inversion. Upon detection of the P1 signal, the P1 decoding process section 251 sends the spectrum inversion detection signal to the selector 59. Also, the P1 decoding process section 251 decodes the detected P1 signal into S1 and S2 signals and supplies these resulting signals to the data decoding process section 60.

[Detailed Composition Example of the P1 Decoding Process Section]

Figure 19:
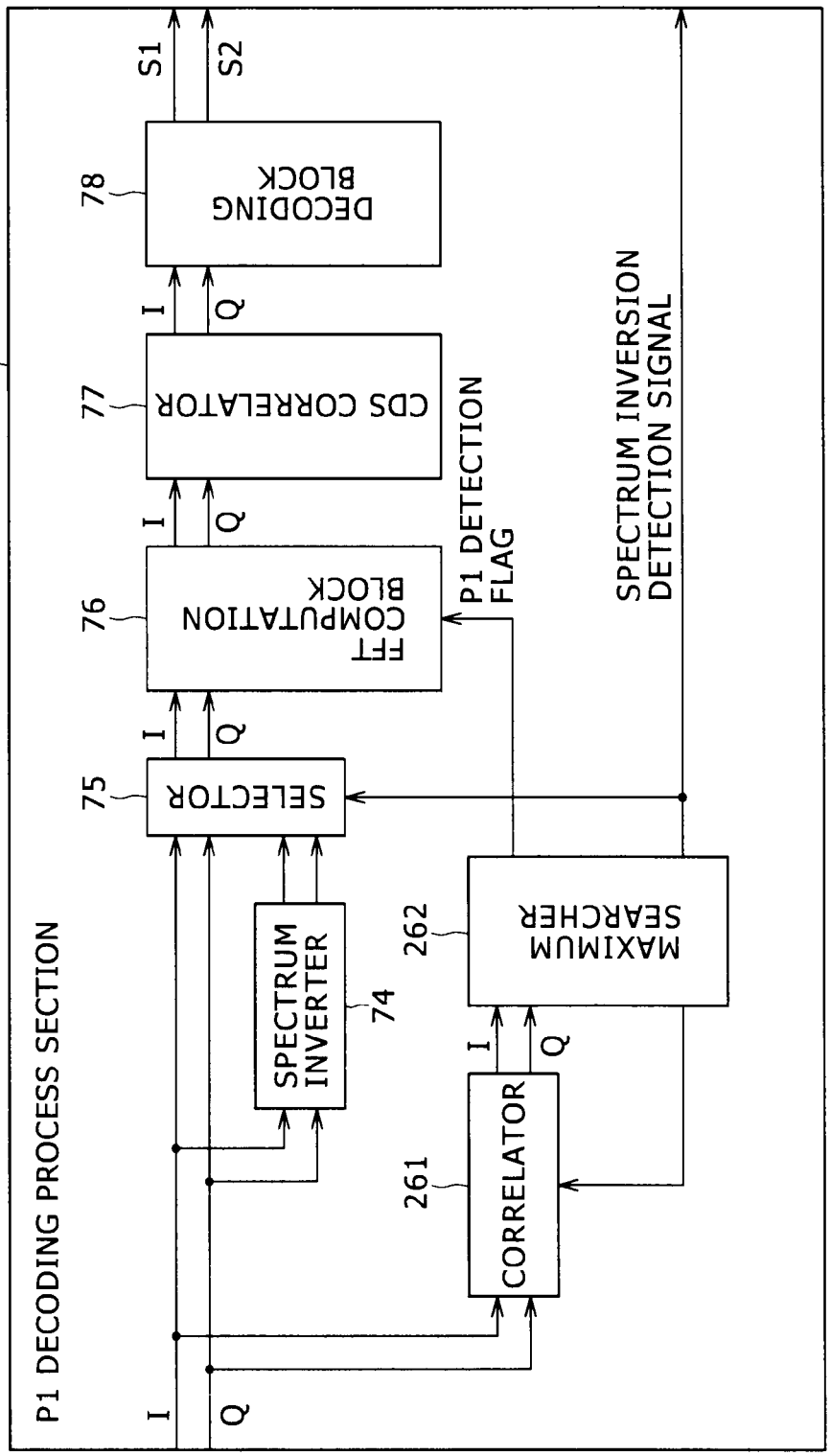
FIG. 19 is a block diagram showing a detailed composition example of a P1 decoding process section included in FIG. 18.

FIG. 19 is a block diagram showing a detailed composition example of the P1 decoding process section 251 included in FIG. 18.

Of the components shown in FIG. 19, those also found in FIG. 6 are designated by like reference numerals, and their descriptions will be omitted hereunder where redundant.

The structure of the P1 decoding process section 251 in FIG. 19 is substantially the same as the structure in FIG. 6 except that a single correlator 261 is installed to replace the correlator 71 and inverse correlator 72 and that a maximum searcher 262 is adopted to replace the maximum searcher 73.

The correlator 261 of the P1 decoding process section 251 obtains the correlation value of the signal supplied from the orthogonal demodulation section 55 in FIG. 18 in accordance with a switching flag which comes from the maximum searcher 262 and which indicates switching from the inversion-present P1 detection process to the inversion-absent P1 detection process or vice versa.

More specifically, if the switching flag indicates switching to the inversion-present P1 detection process, the correlator 261 obtains the correlation value of the signal fed from the orthogonal demodulation section 55 on the assumption that the signal has spectrum inversion occurring therein. Conversely, if the switching flag indicates switching to the inversion-absent P1 detection process, the correlator 261 acquires the correlation value of the signal supplied from the orthogonal demodulation section 55 on the assumption that the signal has no spectrum inversion occurring therein. The correlator 261 sends the correlation value thus obtained to the maximum searcher 262. The correlator 261 will be discussed later in more detail by reference to FIG. 20.

The maximum searcher 262 detects the P1 signal using the correlation value fed from the correlator 261, and detects the occurrence or absence of spectrum inversion. The maximum searcher 262 then sends a P1 detection flag to the FFT computation block 76 and a spectrum inversion detection signal to the selector 75 and selector 59 (FIG. 18). Also, the maximum searcher 262 feeds the switching flag to the correlator 261 in keeping with the P1 detection flag. The maximum searcher 262 will be discussed later in more detail by reference to FIG. 21.

[Detailed Composition Example of the Correlator]

Figure 20:
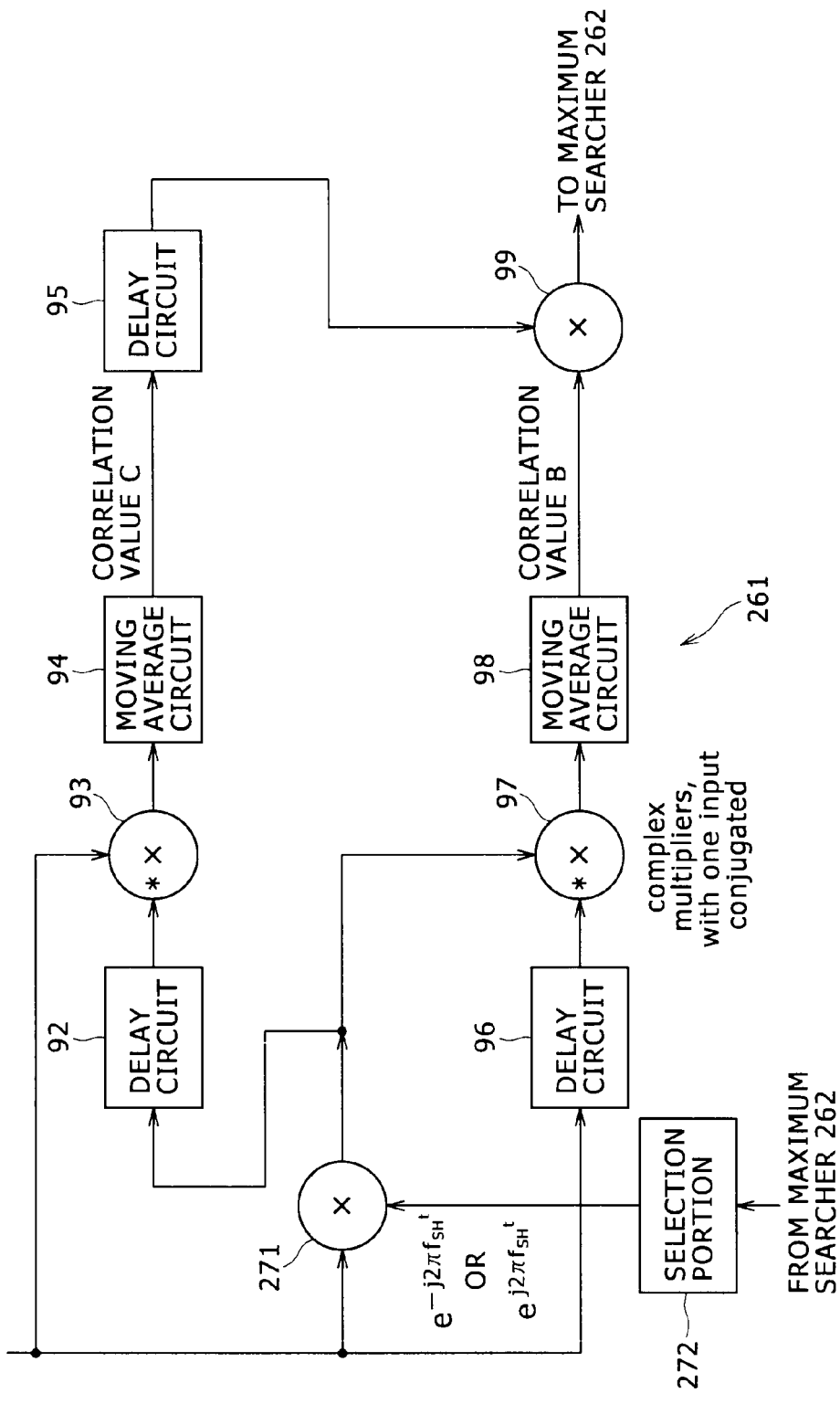
FIG. 20 is a block diagram showing a detailed composition example of a correlator included in FIG. 19.

FIG. 20 is a block diagram showing a detailed composition example of the correlator 261 included in FIG. 19.

Of the components making up the structure of FIG. 20, those also found in the setup of FIG. 7 are designated by like reference numerals, and their descriptions will be omitted hereunder where redundant.

The correlator 261 in FIG. 20 is substantially the same in structure as the correlator in FIG. 7 except that a selection portion 272 is added anew and that a frequency shifter 271 is installed to replace the frequency shifter 91.

The frequency shifter 271 multiplies the signal from the orthogonal demodulation section 55 in FIG. 18 by $e^{-j2\pi f_{SH}i}$ or $e^{j2\pi f_{SH}i}$ supplied from the selection portion 272, thereby shifting the frequency of the signal by a frequency of $f_{SH}$. The frequency shifter 271 sends the signal with its frequency shifted by the frequency $f_{SH}$ to the delay circuit 92 and multiplier 97.

In accordance with the switching flag coming from the maximum searcher 262, the selection portion 272 selects either $e^{-j2\pi f_{SH}i}$ or $e^{j2\pi f_{SH}i}$ and supplies what is selected to the frequency shifter 271. More specifically, if the switching flag indicates switching to the inversion-absent P1 detection process, the selection portion 272 feeds $e^{-j2\pi f_{SH}i}$ to the frequency shifter 271. If the switching flag indicates switching to the inversion-present P1 detection process, then the selection portion 272 supplies $e^{j2\pi f_{SH}i}$ to the frequency shifter 271.

[Detailed Composition Example of the Maximum Searcher]

Figure 21:
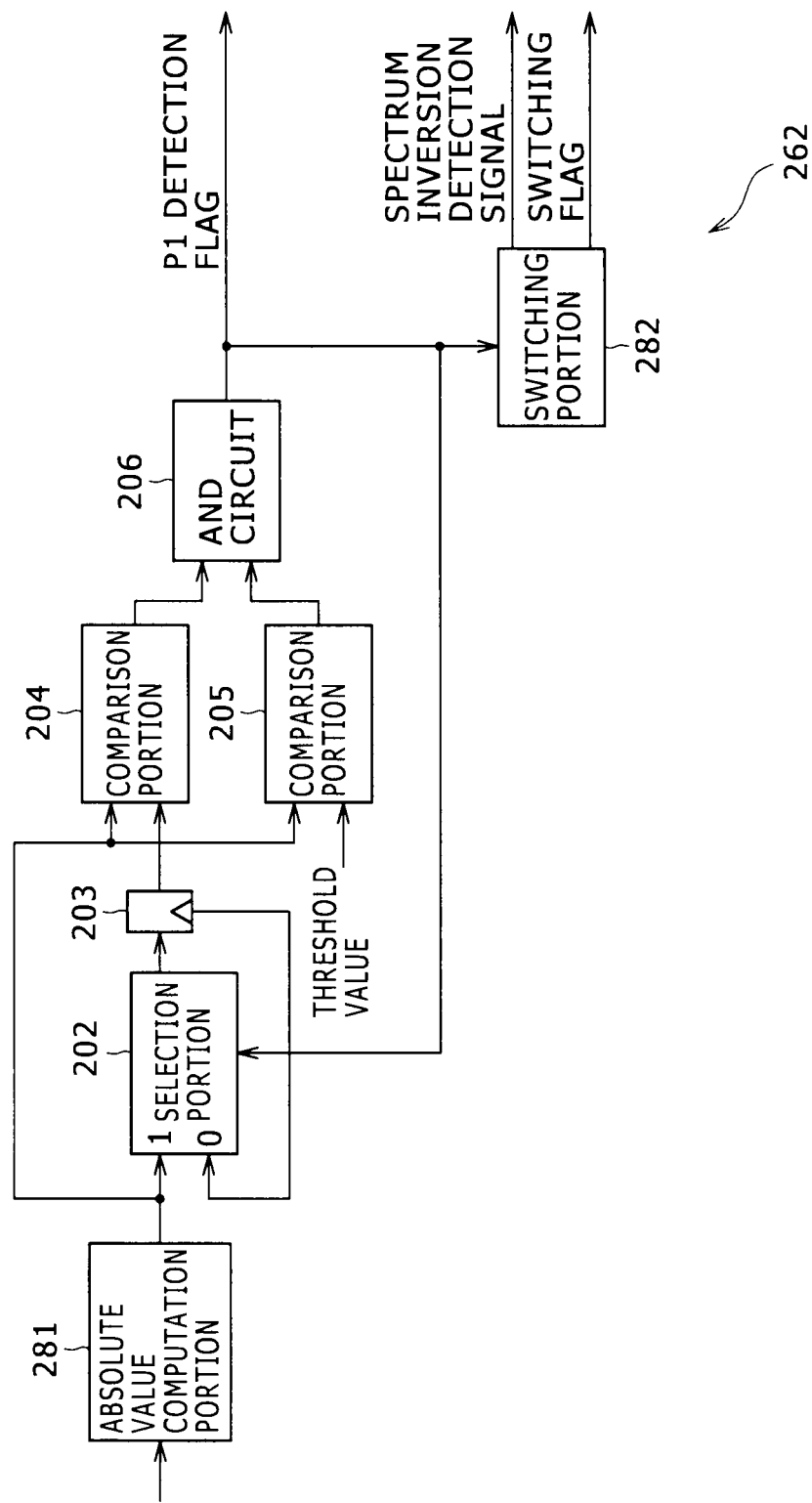
FIG. 21 is a block diagram showing a detailed composition example of a maximum searcher included in FIG. 19.

FIG. 21 is a block diagram showing a detailed composition example of the maximum searcher 262 included in FIG. 19.

Of the components making up the structure of FIG. 21, those also found in FIG. 17 are designated by like reference numerals, and their descriptions will be omitted hereunder where redundant.

The composition of the maximum searcher 262 in FIG. 21 is substantially the same as the setup in FIG. 17 except that a single absolute value computation portion 281 is installed to replace the absolute value computation portions 161 and 171 and the comparison portion 201 and that a switching portion 282 is added anew.

The absolute value computation portion 281 obtains the absolute value of the correlation value fed from the correlator 261 (FIG. 20) and composed of the I and Q components. The absolute value thus acquired is sent from the absolute value computation portion 281 to the selection portion 202 and comparison portions 204 and 205.

The switching portion 282 outputs a switching flag to the correlator 261 using the P1 detection flag output from the AND circuit 206. More specifically, if the P1 detection flag is not output within a predetermined time period from the AND circuit 206, the switching portion 282 determines that the occurrence or absence of spectrum inversion is falsely detected by the inversion-present P1 detection process or by the inversion-absent P1 detection process being currently carried out, and outputs a switching flag for switching to the other process to the correlator 261.

If the level of the P1 detection flag is found to be High, then the switching portion 282 detects the occurrence or absence of spectrum inversion corresponding to the process pointed to by the switching flag. The switching portion 282 proceeds to output a spectrum inversion detection signal to the selector 75 (FIG. 19) and selector 59 (FIG. 18).

That is, if the level of the P1 detection flag is found to be High and if the correlation value is acquired by the correlator 261 on the assumption that spectrum inversion has occurred in the signal supplied from the orthogonal demodulation section 55, the switching portion 282 outputs the spectrum inversion detection signal indicating the occurrence of spectrum inversion. If the level of the P1 detection flag is found to be High and if the correlation value is obtained by the correlator 261 on the assumption that spectrum inversion has not occurred in the signal fed from the orthogonal demodulation section 55, then the switching portion 282 outputs the spectrum inversion detection signal indicating the absence of spectrum inversion.

As described, if the P1 detection flag is not output at least for a predetermined time period, then the reception system 250 determines that the occurrence or absence of spectrum inversion is falsely detected. However, this method of determination is not limitative of the present invention. Alternatively, the occurrence or absence of spectrum inversion may be determined to be falsely detected if the values of the S1 and S2 signals of the T2 frame output from the decoding block 78 (FIG. 19) are not constant and are thus indicative of the P1 signal being incorrectly decoded.

Also as described, if the occurrence or absence of spectrum inversion is found to be falsely detected, the reception system 250 causes the frequency shifter 271 to change the direction of frequency shift. Alternatively, the frequency shifter 271 may be arranged to shift the direction of frequency shift at predetermined time intervals. In this case, the maximum searcher 262 may obtain the largest value of the correlation values in effect as the frequency is shifted in each of the different directions, compare the maximum correlation values thus obtained, and output the spectrum inversion detection signal and P1 detection flag corresponding to the largest value of the correlation values.

<Third Embodiment>

[Configuration Example of the Reception System as the Third Embodiment]

Figure 22:
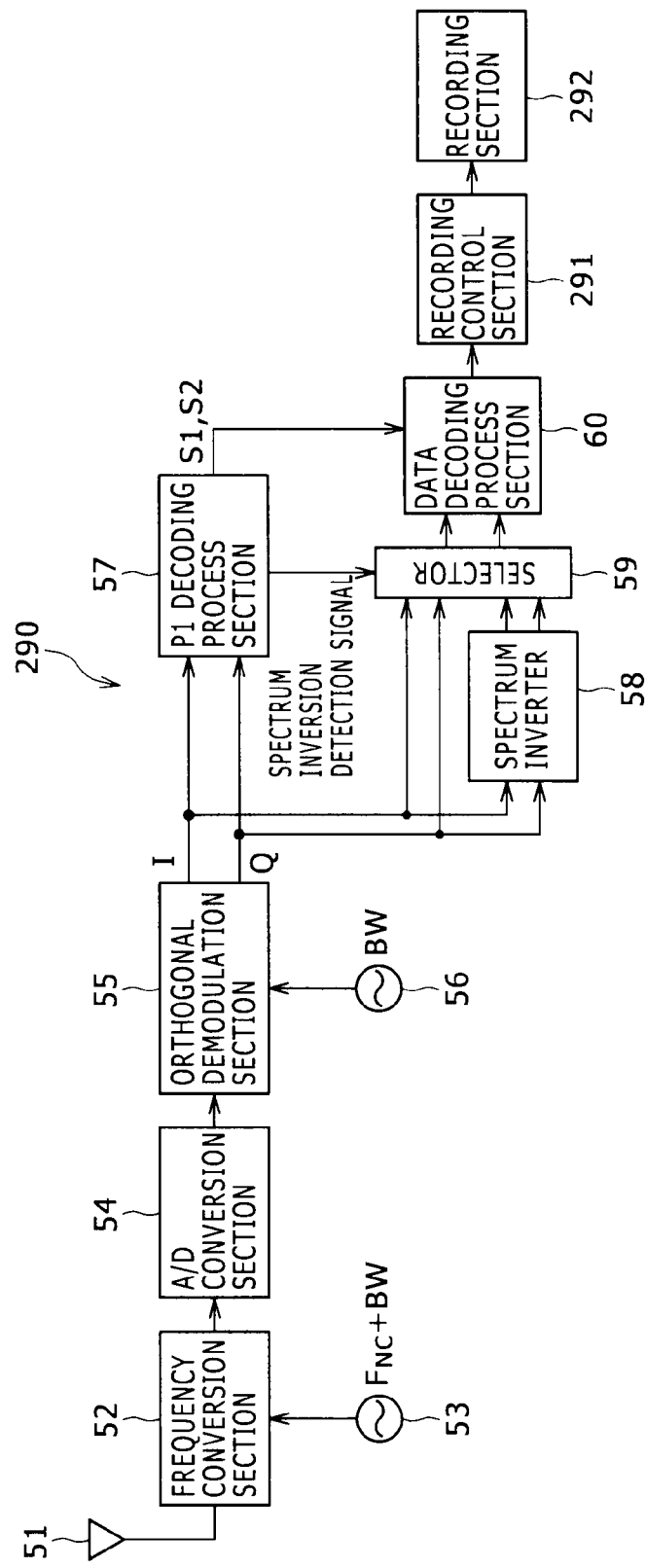
FIG. 22 is a block diagram showing a configuration example of a reception system as a third embodiment of the present invention.

FIG. 22 is a block diagram showing a configuration example of a reception system as the third embodiment of the present invention.

Of the components making up the configuration in FIG. 22, those also found in FIG. 5 are designated by like reference numerals, and their descriptions will be omitted hereunder where redundant.

The configuration of the reception system 290 in FIG. 22 is substantially the same as the configuration in FIG. 5 except that a recording control section 291 and a recording section 292 are installed to replace the output section 61. The reception system 290 records broadcast signals without outputting images or sounds corresponding to the signals.

More specifically, the recording control section 291 causes the recording section 292 to record the broadcast signal output from the data decoding process section 60. The recording section 292 is composed of a hard disk or of removable media such as magnetic disks, optical disks, magneto-optical disks, or semiconductor memory.

Although not shown, the output section 61 of the reception system 250 in FIG. 18 may be replaced by the recording control section 291 and recording section 292.

The above-mentioned broadcast signal may be an IP-TV broadcast signal. In such a case, the transmission system 10 and reception system 50 (250, 290) have a network interface set up for DVB-T2 signal transmission and reception, and utilize the Internet as their transmission channel. The broadcast signal may also be a CATV broadcast signal. In this case, the transmission system 10 and reception system 50 (250, 290) are furnished with terminals connecting to the cable for DVB-T2 signal transmission and reception, and utilize the cable as their transmission channel.

In the foregoing description, the spectrum inverter 58 was shown always to perform the spectrum inversion process regardless of the occurrence or absence of spectrum inversion being detected. Alternatively, the spectrum inverter 58 may be arranged to carry out the spectrum inversion process only when the occurrence of spectrum inversion is detected.

In that case, the spectrum inversion detection signal is input from the P1 decoding process section 57 to the spectrum inverter 58. If the spectrum inversion detection signal indicates the occurrence of spectrum inversion, the spectrum inverter 58 performs the spectrum inversion process. If the spectrum inversion detection signal indicates the absence of spectrum inversion, then the spectrum inverter 58 does not carry out the spectrum inversion process. Also, the selector 59 is not installed. The spectrum inverter 58 supplies the data decoding process section 60 with the resulting signal composed of the I and Q components.

The series of the steps and processes described above may be executed either by hardware or by software.

In such cases, a personal computer such as one shown in FIG. 23 may be used at least as part of the aforementioned reception system.

In FIG. 23, a CPU (central processing unit) 301 performs various processes in accordance with the programs recorded in a ROM (read only memory) 302 or with the programs loaded from a storage unit 308 into a RAM (random access memory) 303. The RAM 303 may also accommodate data needed by the CPU 301 in carrying out its diverse processing.

The CPU 301, ROM 302, and RAM 303 are interconnected by a bus 304. An input/output interface 305 is also connected to the bus 304.

The input/output interface 305 is connected with an input unit 306 typically made up of a keyboard and a mouse, with an output unit 307 composed illustratively of a display, with a storage unit 308 typically constituted by a hard disk, and with a communication unit 309 generally formed by a modem and a terminal adapter. The communication unit 309 controls communications conducted with other devices (not shown) via networks including the Internet.

A drive 310 is also connected as needed to the input/output interface 305. Removable media 311 such as magnetic disks, optical disks, magneto-optical disks or semiconductor memory may be loaded into the drive 310. The computer programs retrieved from the loaded removable medium may be installed as needed into the storage unit 308.

Where the series of the processes above are to be executed by software, the programs constituting the software may be either retrieved from dedicated hardware of the computer in use or installed over networks or from a suitable recording medium into a general-purpose computer or like equipment capable of executing diverse functions based on the installed programs.

As shown in FIG. 23, the recording media that hold these programs are distributed to users not only as the removable media (package media) 311 apart from their apparatuses and constituted by magnetic disks (including floppy disks), optical disks (including CD-ROM (compact disk-read only memory), DVD (digital versatile disk) and Blu-ray disk), magneto-optical disks (including MD (Mini-disk)), or semiconductor memories, the media carrying the programs offered to the users; but also in the form of the ROM 302 or the hard disk drive in the storage unit 308, the medium accommodating the programs and incorporated beforehand in the users' apparatuses.

In this specification, the steps describing the programs recorded on the recording medium represent not only the processes that are to be carried out in the depicted sequence (i.e., on a time series basis) but also processes that may be performed parallelly or individually and not necessarily chronologically.

The present application contains subject matter related to that disclosed in Japanese Priority Patent Application JP 2009-283758 filed in the Japan Patent Office on Dec. 15, 2009, the entire content of which is hereby incorporated by reference.

It should be understood by those skilled in the art that various modifications, combinations, sub-combinations and alternations may occur depending on design requirements and other factors insofar as they are within the scope of the appended claims or the equivalent thereof.

What is claimed is:

1. A reception apparatus comprising:

spectrum inversion detection means for detecting the occurrence or absence of spectrum inversion in a received signal complying with the Digital Video Broadcasting-Terrestrial 2 standard known as DVB-T2, using a P1 signal constituting said received signal;

spectrum inversion means for performing a spectrum inversion process on said received signal if the occurrence of said spectrum inversion is detected at least by said spectrum inversion detection means; and demodulation means for demodulating said received signal having undergone said spectrum inversion process if the occurrence of said spectrum inversion is detected by said spectrum inversion detection means, said demodulation means further demodulating said received signal yet to undergo said spectrum inversion process if the absence of said spectrum inversion is detected by said spectrum inversion detection means, wherein said spectrum inversion means always performs said spectrum inversion process on said received signal regardless of whether the occurrence or the absence of said spectrum inversion is detected.

2. The reception apparatus according to claim 1, further comprising:
- correlation means for obtaining a correlation value between said received signal and a signal acquired by shifting the frequency of said received signal by a frequency difference between a real information part constituting said P1 signal and an overlay part overlaid with said real information part, on the assumption that said spectrum inversion has not occurred in said received signal; and
- inverse correlation means for obtaining a correlation value between said received signal and a signal acquired by shifting the frequency of said received signal by said frequency difference on the assumption that said spectrum inversion has occurred in said received signal,
- wherein, if said received signal is said P1 signal, then said spectrum inversion detection means detects the occurrence or absence of said spectrum inversion based on a result of comparing a maximum absolute value of said correlation value acquired by said correlation means, with a maximum absolute value of said correlation value obtained by said inverse correlation means.

3. The reception apparatus according to claim 2, further comprising
- P1 detection means for detecting that said received signal is said P1 signal if the larger of the two absolute correlation values obtained by said correlation means and said inverse correlation means is a maximum value,
- wherein said spectrum inversion detection means detects the occurrence or absence of said spectrum inversion if said P1 detection means detects that said received signal is said P1 signal.

4. The reception apparatus according to claim 3, wherein:
- said demodulation means includes FFT computation means for performing FFT computation on said received signal having undergone said spectrum inversion process if said spectrum inversion detection means detects the occurrence of said spectrum inversion at a timing at which said P1 detection means detects that said received signal is said P1 signal, said FFT computation means further performing FFT computation on said received signal yet to undergo said spectrum inversion process if said spectrum inversion detection means detects the absence of said spectrum inversion at the same timing; and
- said FFT computation means resets said FFT computation every time said P1 detection means detects that said received signal is said P1 signal.

5. The reception apparatus according to claim 1, further comprising:
- correlation means for obtaining a correlation value between said received signal and a signal acquired by shifting the frequency of said received signal by a frequency difference between a real information part constituting said P1 signal and an overlay part overlaid with said real information part, on the assumption that said spectrum inversion has not occurred in said received signal, said correlation means further obtaining a correlation value between said received signal and a signal acquired by shifting the frequency of said received signal by said frequency difference on the assumption that said spectrum inversion has occurred in said received signal; and
- P1 detection means for detecting that said received signal is said P1 signal if the absolute value of said correlation value obtained by said correlation means is a maximum value,
- wherein, if said P1 detection means detects that said received signal is said P1 signal and if said correlation value is obtained by said correlation means on the assumption that said spectrum inversion has not occurred in said received signal, then said spectrum inversion detection means detects the absence of said spectrum inversion, said spectrum inversion detection means further detecting the occurrence of said spectrum inversion if said correlation value is obtained by said correlation means on the assumption that said spectrum inversion has occurred in said received signal.

6. The reception apparatus according to claim 5, wherein:
- said demodulation means includes FFT computation means for performing FFT computation on said received signal having undergone said spectrum inversion process if said spectrum inversion detection means detects the occurrence of said spectrum inversion at a timing at which said P1 detection means detects that said received signal is said P1 signal, said FFT computation means further performing FFT computation on said received signal yet to undergo said spectrum inversion process if said spectrum inversion detection means detects the absence of said spectrum inversion at the same timing; and
- said FFT computation means resets said FFT computation every time said P1 detection means detects that said received signal is said P1 signal.

7. A reception method for use with a reception apparatus receiving a received signal complying with the Digital Video Broadcasting-Terrestrial 2 standard known as DVB-T2, said reception method comprising the steps of:
- detecting the occurrence or absence of spectrum inversion in said received signal using a P1 signal constituting said received signal;
- performing a spectrum inversion process on said received signal if the occurrence of said spectrum inversion is detected at least in the spectrum inversion detecting step;
- demodulating said received signal having undergone said spectrum inversion process if the occurrence of said spectrum inversion is detected in said spectrum inversion detecting step; and
- demodulating said received signal yet to undergo said spectrum inversion process if the absence of said spectrum inversion is detected in said spectrum inversion detecting step,
- wherein said spectrum inversion process is always performed on said received signal regardless of whether the occurrence or the absence of said spectrum inversion is detected.

8. A non-transitory computer-readable storage medium having computer readable program codes for controlling reception of a received signal complying with the Digital Video Broadcasting-Terrestrial 2 standard known as DVB-T2, embodied in the computer readable storage medium, the computer readable program codes, when executed cause a computer to execute a process comprising the steps of:
- detecting the occurrence or absence of spectrum inversion in said received signal using a P1 signal constituting said received signal;
- performing a spectrum inversion process on said received signal if the occurrence of said spectrum inversion is detected at least in the spectrum inversion detecting step;
- demodulating said received signal having undergone said spectrum inversion process if the occurrence of said spectrum inversion is detected in said spectrum inversion detecting step; and demodulating said received signal yet to undergo said spectrum inversion process if the absence of said spectrum inversion is detected in said spectrum inversion detecting step, wherein said spectrum inversion process is always performed on said received signal regardless of whether the occurrence or the absence of said spectrum inversion is detected.

9. A reception system comprising:

acquisition means for acquiring over a transmission channel a signal complying with the Digital Video Broadcasting-Terrestrial 2 standard known as DVB-T2, as a received signal; and transmission channel decoding process means for performing a transmission channel decoding process on said received signal acquired by said acquisition means, wherein said transmission channel decoding process means includes spectrum inversion detection means for detecting the occurrence or absence of spectrum inversion in said received signal using a P1 signal constituting said received signal, spectrum inversion means for performing a spectrum inversion process on said received signal if the occurrence of said spectrum inversion is detected at least by said spectrum inversion detection means, and demodulation means for demodulating said received signal having undergone said spectrum inversion process if the occurrence of said spectrum inversion is detected by said spectrum inversion detection means, said demodulation means further demodulating said received signal yet to undergo said spectrum inversion process if the absence of said spectrum inversion is detected by said spectrum inversion detection means.

10. A reception system comprising:

transmission channel decoding process means for performing a transmission channel decoding process on a received signal which is acquired over a transmission channel and which complies with the Digital Video Broadcasting-Terrestrial 2 standard known as DVB-T2; and information source decoding process means for performing an information source decoding process on said received signal having undergone said transmission channel decoding process performed by said transmission channel decoding process means, wherein said transmission channel decoding process means includes spectrum inversion detection means for detecting the occurrence or absence of spectrum inversion in said received signal using a P1 signal constituting said received signal, spectrum inversion means for performing a spectrum inversion process on said received signal if the occurrence of said spectrum inversion is detected at least by said spectrum inversion detection means, and demodulation means for demodulating said received signal having undergone said spectrum inversion process if the occurrence of said spectrum inversion is detected by said spectrum inversion detection means, said demodulation means further demodulating said received signal yet to undergo said spectrum inversion process if the absence of said spectrum inversion is detected by said spectrum inversion detection means.

11. A reception system comprising:

transmission channel decoding process means for performing a transmission channel decoding process on a received signal which is acquired over a transmission channel and which complies with the Digital Video Broadcasting-Terrestrial 2 standard known as DVB-T2; and output means for outputting an image or a sound based on said received signal having undergone said transmission channel decoding process performed by said transmission channel decoding process means, wherein said transmission channel decoding process means includes spectrum inversion detection means for detecting the occurrence or absence of spectrum inversion in said received signal using a P1 signal constituting said received signal, spectrum inversion means for performing a spectrum inversion process on said received signal if the occurrence of said spectrum inversion is detected at least by said spectrum inversion detection means, and demodulation means for demodulating said received signal having undergone said spectrum inversion process if the occurrence of said spectrum inversion is detected by said spectrum inversion detection means, said demodulation means further demodulating said received signal yet to undergo said spectrum inversion process if the absence of said spectrum inversion is detected by said spectrum inversion detection means.

12. A reception system comprising:

transmission channel decoding process means for performing a transmission channel decoding process on a received signal which is acquired over a transmission channel and which complies with the Digital Video Broadcasting-Terrestrial 2 standard known as DVB-T2; and recording control means for controlling the recording of said received signal having undergone said transmission channel decoding process performed by said transmission channel decoding process means, wherein said transmission channel decoding process means includes spectrum inversion detection means for detecting the occurrence or absence of spectrum inversion in said received signal using a P1 signal constituting said received signal, spectrum inversion means for performing a spectrum inversion process on said received signal if the occurrence of said spectrum inversion is detected at least by said spectrum inversion detection means, and demodulation means for demodulating said received signal having undergone said spectrum inversion process if the occurrence of said spectrum inversion is detected by said spectrum inversion detection means, said demodulation means further demodulating said received signal yet to undergo said spectrum inversion process if the absence of said spectrum inversion is detected by said spectrum inversion detection means.

13. A reception apparatus comprising:

a spectrum inversion detection section configured to detect the occurrence or absence of spectrum inversion in a received signal complying with the Digital Video Broadcasting-Terrestrial 2 standard known as DVB-T2, using a P1 signal constituting said received signal;

a spectrum inversion section configured to perform a spectrum inversion process on said received signal if the occurrence of said spectrum inversion is detected at least by said spectrum inversion detection section; and a demodulation section configured to demodulate said received signal having undergone said spectrum inversion process if the occurrence of said spectrum inversion is detected by said spectrum inversion detection section, said demodulation section further demodulating said received signal yet to undergo said spectrum inversion process if the absence of said spectrum inversion is detected by said spectrum inversion detection section wherein said spectrum inversion section always performs said spectrum inversion process on said received signal regardless of whether the occurrence or the absence of said spectrum inversion is detected.

14. A reception system comprising:
an acquisition section configured to acquire over a transmission channel a signal complying with the Digital Video Broadcasting-Terrestrial 2 standard known as DVB-T2, as a received signal; and
a transmission channel decoding process section configured to perform a transmission channel decoding process on said received signal acquired by said acquisition section,
wherein said transmission channel decoding process section includes
 a spectrum inversion detection section configured to detect the occurrence or absence of spectrum inversion in said received signal using a P1 signal constituting said received signal,
 a spectrum inversion section configured to perform a spectrum inversion process on said received signal if the occurrence of said spectrum inversion is detected at least by said spectrum inversion detection section, and
 a demodulation section configured to demodulate said received signal having undergone said spectrum inversion process if the occurrence of said spectrum inversion is detected by said spectrum inversion detection section, said demodulation section further demodulating said received signal yet to undergo said spectrum inversion process if the absence of said spectrum inversion is detected by said spectrum inversion detection section.

15. A reception system comprising:
a transmission channel decoding process section configured to perform a transmission channel decoding process on a received signal which is acquired over a transmission channel and which complies with the Digital Video Broadcasting-Terrestrial 2 standard known as DVB-T2; and
an information source decoding process section configured to perform an information source decoding process on said received signal having undergone said transmission channel decoding process performed by said transmission channel decoding process section,
wherein said transmission channel decoding process section includes
 a spectrum inversion detection section configured to detect the occurrence or absence of spectrum inversion in said received signal using a P1 signal constituting said received signal,
 a spectrum inversion section configured to perform a spectrum inversion process on said received signal if the occurrence of said spectrum inversion is detected at least by said spectrum inversion detection section, and
 a demodulation section configured to demodulate said received signal having undergone said spectrum inversion process if the occurrence of said spectrum inversion is detected by said spectrum inversion detection section, said demodulation section further demodulating said received signal yet to undergo said spectrum inversion process if the absence of said spectrum inversion is detected by said spectrum inversion detection section.

16. A reception system comprising:
a transmission channel decoding process section configured to perform a transmission channel decoding process on a received signal which is acquired over a transmission channel and which complies with the Digital Video Broadcasting-Terrestrial 2 standard known as DVB-T2; and
an output section configured to output an image or a sound based on said received signal having undergone said transmission channel decoding process performed by said transmission channel decoding process section,
wherein said transmission channel decoding process section includes
 a spectrum inversion detection section configured to detect the occurrence or absence of spectrum inversion in said received signal using a P1 signal constituting said received signal,
 a spectrum inversion section configured to perform a spectrum inversion process on said received signal if the occurrence of said spectrum inversion is detected at least by said spectrum inversion detection section, and
 a demodulation section configured to demodulate said received signal having undergone said spectrum inversion process if the occurrence of said spectrum inversion is detected by said spectrum inversion detection section, said demodulation section further demodulating said received signal yet to undergo said spectrum inversion process if the absence of said spectrum inversion is detected by said spectrum inversion detection section.

17. A reception system comprising:
a transmission channel decoding process section configured to perform a transmission channel decoding process on a received signal which is acquired over a transmission channel and which complies with the Digital Video Broadcasting-Terrestrial 2 standard known as DVB-T2; and
a recording control section configured to control the recording of said received signal having undergone said transmission channel decoding process performed by said transmission channel decoding process section,
wherein said transmission channel decoding process section includes
 a spectrum inversion detection section configured to detect the occurrence or absence of spectrum inversion in said received signal using a P1 signal constituting said received signal,
 a spectrum inversion section configured to perform a spectrum inversion process on said received signal if the occurrence of said spectrum inversion is
detected at least by said spectrum inversion detection section, and a demodulation section configured to demodulate said received signal having undergone said spectrum inversion process if the occurrence of said spectrum inversion is detected by said spectrum inversion detection section, said demodulation section further demodulating said received signal yet to undergo said spectrum inversion process if the absence of said spectrum inversion is detected by said spectrum inversion detection section.

18. A reception apparatus comprising:
spectrum inversion detection means for detecting the occurrence or absence of spectrum inversion in a received signal complying with the Digital Video Broadcasting-Terrestrial 2 standard known as DVB-T2, using a P1 signal constituting said received signal;
spectrum inversion means for performing a spectrum inversion process on said received signal if the occurrence of said spectrum inversion is detected at least by said spectrum inversion detection means;
demodulation means for demodulating said received signal having undergone said spectrum inversion process if the occurrence of said spectrum inversion is detected by said spectrum inversion detection means, said demodulation means further demodulating said received signal yet to undergo said spectrum inversion process if the absence of said spectrum inversion is detected by said spectrum inversion detection means;
correlation means for obtaining a correlation value between said received signal and a signal acquired by shifting the frequency of said received signal by a frequency difference between a real information part constituting said P1 signal and an overlay part overlaid with said real information part, on the assumption that said spectrum inversion has not occurred in said received signal; and
inverse correlation means for obtaining a correlation value between said received signal and a signal acquired by shifting the frequency of said received signal by said frequency difference on the assumption that said spectrum inversion has occurred in said received signal,
wherein, if said received signal is said P1 signal, then said spectrum inversion detection means detects the occurrence or absence of said spectrum inversion based on a result of comparing a maximum absolute value of said correlation value acquired by said correlation means, with a maximum absolute value of said correlation value obtained by said inverse correlation means.

* * * * *